United States Patent
Asai

(10) Patent No.: US 11,489,976 B2
(45) Date of Patent: *Nov. 1, 2022

(54) MOBILE TERMINAL STORES PROGRAM TO SELECT APPROPRIATE IMAGE PROCESSING DEVICE TO EXECUTE ONE OF PLURALITY OF IMAGE PROCESSING OPERATIONS BY DESIGNATING AN OPERATION ID IDENTIFYING A DESIGNATABLE OPERATION

(71) Applicant: BROTHER KOGYO KABUSHIKI KAISHA, Nagoya (JP)

(72) Inventor: Norihiko Asai, Tajimi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/444,606

(22) Filed: Jun. 18, 2019

(65) Prior Publication Data

US 2019/0335044 A1    Oct. 31, 2019

Related U.S. Application Data

(63) Continuation of application No. 15/697,760, filed on Sep. 7, 2017, now Pat. No. 10,389,892.

(30) Foreign Application Priority Data

Sep. 15, 2016  (JP) .................................. 2016-180404
Sep. 15, 2016  (JP) .................................. 2016-180405

(51) Int. Cl.
*H04N 1/21*  (2006.01)
*H04N 1/00*  (2006.01)
(Continued)

(52) U.S. Cl.
CPC ..... *H04N 1/00225* (2013.01); *H04N 1/00233* (2013.01); *H04N 1/00307* (2013.01);
(Continued)

(58) Field of Classification Search
None
See application file for complete search history.

(56) References Cited

U.S. PATENT DOCUMENTS 8,630,000 B2 *  1/2014  Chang ................ H04N 1/00938
                                                    358/1.15
2002/0051200 A1   5/2002  Chang et al.
(Continued)

FOREIGN PATENT DOCUMENTS

JP         2012-203742 A      10/2012

*Primary Examiner* — Haris Sabah
(74) *Attorney, Agent, or Firm* — Merchant & Gould P.C.

(57) ABSTRACT

A non-transitory computer-readable recording medium storing a first instruction-set of computer-readable instructions for a terminal device. The first instruction-set causes, when executed by the controller, the mobile terminal to receive a user operation to designate a designated second instruction-set through the input interface, and determine whether the memory stores designated device information including an operation ID identifying a designatable operation. When the designated device information is not stored in a memory, the mobile terminal searches for an image processing device capable of executing the designatable operation, receives a user operation to designate the designated device, stores designated device information in the memory, starts the designated program, obtains the operation ID of the designatable operation from the designated program, and transmits first instruction information to the designated device. The first instruction information is information causing the image processing device to execute the designatable operation identified by the operation ID as obtained.

14 Claims, 12 Drawing Sheets

(51) Int. Cl.
*G06F 3/0482* (2013.01)
*G06F 3/12* (2006.01)

(52) U.S. Cl.
CPC ....... *H04N 1/00411* (2013.01); *H04N 1/2166*
(2013.01); *G06F 3/0482* (2013.01); *G06F 3/1255* (2013.01); *G06F 3/1297* (2013.01);
*H04N 2201/0046* (2013.01); *H04N 2201/0055* (2013.01); *H04N 2201/0094* (2013.01)

(56) References Cited

U.S. PATENT DOCUMENTS

| | | | | |
|---|---|---|---|---|
| 2005/0141013 A1* | 6/2005 | Kikuchi | ................ | G06F 3/1261 358/1.14 |
| 2011/0069341 A1* | 3/2011 | Kim | ..................... | G06F 3/1204 358/1.15 |
| 2011/0317211 A1* | 12/2011 | Yamada | ................... | G06F 9/50 358/1.15 |
| 2012/0188599 A1* | 7/2012 | Kyono | .................. | G06F 3/1203 358/1.15 |
| 2012/0243043 A1 | 9/2012 | Asai | | |
| 2014/0009794 A1* | 1/2014 | Honda | ................... | G03G 21/02 358/1.15 |
| 2015/0070725 A1* | 3/2015 | Monden | ................ | G06F 3/1232 358/1.15 |
| 2015/0378659 A1* | 12/2015 | Asai | ..................... | G06F 3/1236 358/1.15 |
| 2016/0173704 A1 | 6/2016 | Asai | | |
| 2016/0179449 A1* | 6/2016 | Cho | ..................... | G06F 3/1275 358/1.15 |

\* cited by examiner

FIG. 3

| PROGRAM ID | INSTALL FLAG | PI FUNCTION LIST ||||  CONTENTS INFORMATION ||
|---|---|---|---|---|---|---|---|
| | | SHEET PRINT | LABEL PRINT | SHEET SCAN | LABEL SCAN | OPERATION ID | URI |
| LABEL | YES | OFF | ON | OFF | ON | — | — |
| MAP | YES | ON | OFF | OFF | OFF | SHEET PRINT | MAP01.JPEG |
| NAME CARD | NO | OFF | OFF | ON | OFF | — | — |

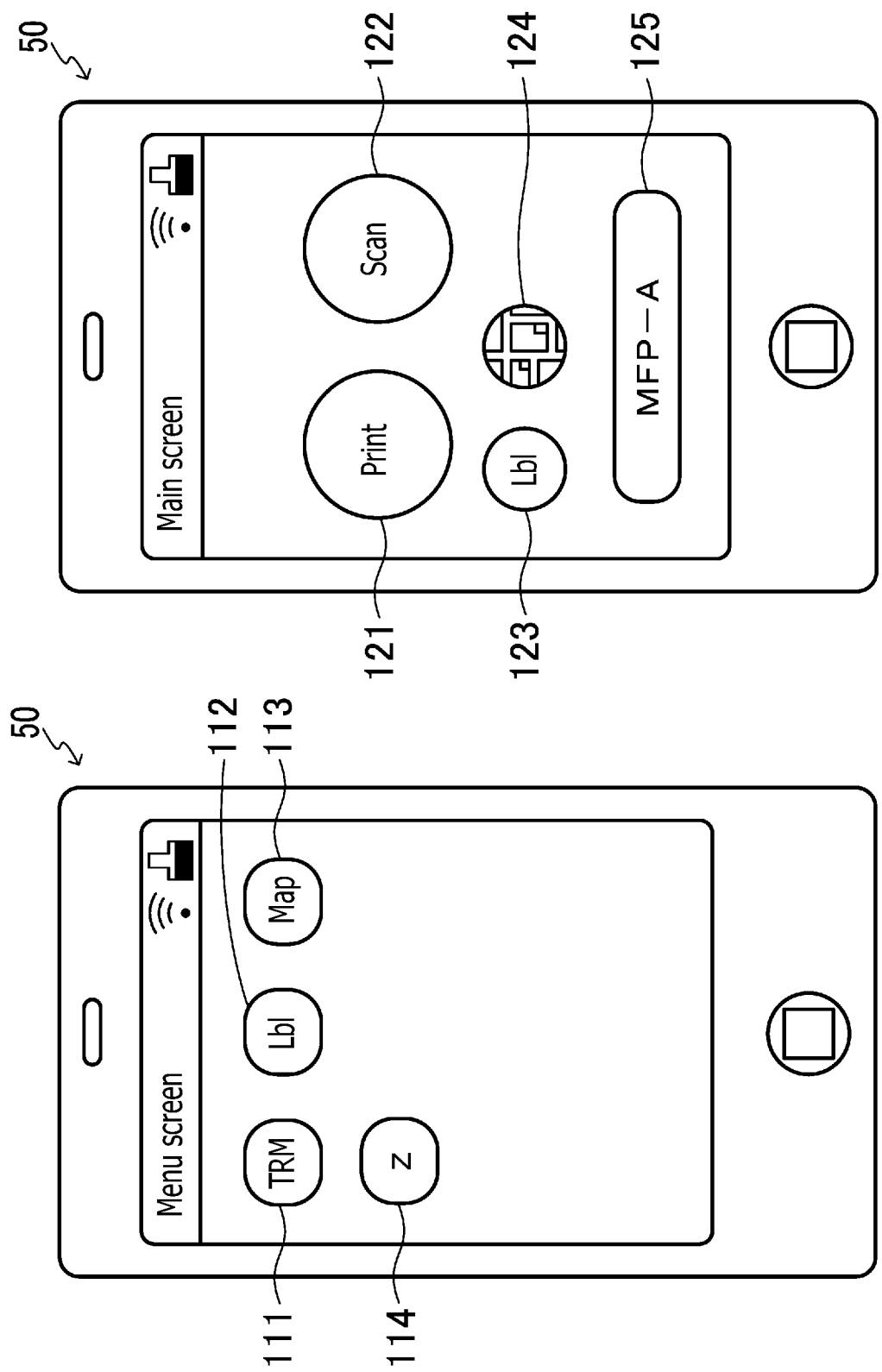

MOBILE TERMINAL STORES PROGRAM TO SELECT APPROPRIATE IMAGE PROCESSING DEVICE TO EXECUTE ONE OF PLURALITY OF IMAGE PROCESSING OPERATIONS BY DESIGNATING AN OPERATION ID IDENTIFYING A DESIGNATABLE OPERATION

CROSS-REFERENCE TO RELATED APPLICATIONS

This application is a continuation of U.S. patent application Ser. No. 15/697,760, filed Sep. 7, 2017, which further claims priority under 35 U.S.C. § 119 from Japanese Patent Applications No. 2016-180404 and No. 2016-180405 both filed on Sep. 15, 2016. The entire subject matters of the applications are incorporated herein by reference.

BACKGROUND

Technical Field

The present disclosures relate a non-transitory computer-readable recording medium for a mobile terminal containing a program which cause, when executed by a controller of the mobile terminal, the mobile terminal to control an image processing device using another program installed in the mobile terminal.

Related Art

There is known a technique in which a master program and subordinate programs are installed in a mobile terminal, and the master program starts one of the subordinate programs so that the started subordinate program transmits an instruction, to an image processing device, causing the image processing device to execute an image processing operation. For example, such a master program can cause a subordinate program which causes the image processing device to output designated image data. For another example, such a master program may cause another subordinate program to edit image data generated by an input operation which is executed by the image processing device under control of the master program.

SUMMARY

When the subordinate program is started, if an appropriate image processing device is not connected with the mobile terminal, an operation using the subordinate program cannot be completed. That is, a user of such a mobile terminal needs to select an appropriate image processing device before instructing to start a subordinate program. In view of diversification of image processing devices and subordinate programs, load to the user who is required to follow the above-describe process is increasing.

According to aspects of the disclosures, there is provided a non-transitory computer-readable recording medium storing a first instruction-set of computer-readable instructions for a terminal device having a memory, an input interface, a communication interface, and a controller. The first instruction-set of the computer-readable instructions, when executed by the controller, causes the mobile terminal to perform a first receiving process of receiving a user operation to designate a designated second instruction-set, which is one of the plurality of second instruction-sets, through the input interface, each of the plurality of second instruction-sets being stored in the memory, the first instruction-set being capable of starting anyone of the plurality of second instruction-sets, each of the plurality of second instruction-sets being configured to instruct an image processing device, which is capable of executing at least one of a plurality of image processing operations, to execute the at least one of the plurality of image processing operations through the first instruction-set, and a first determining process of determining whether the memory stores designated device information including an operation ID identifying a designatable operation. The designatable operation being one of the image processing operations the designated second instruction-set being capable of requesting the image processing device to execute. The designated device information includes the operation ID identifying the image processing operation which can be executed by the designated device which is one of the image processing device designated by the user. The first instruction-set of the computer-readable instructions, when executed by the controller, further causing the mobile terminal to perform a first searching process of searching, in response to determination that the designated device information is not stored in the memory, for the image processing device capable of executing the designatable operation from among the plurality of image processing devices capable of communicating with the mobile terminal through the communication interface, a second receiving process of receiving a user operation to designate the designated device which is one of the image processing devices found by searching through the input interface, a first storing process of storing the designated device information of the designated device designed by the user operation as received in the memory, a starting process of starting the designated second instruction-set with the designated device information including the operation ID of the designatable operation being stored in the memory, an obtaining process of obtaining the operation ID of the designatable operation from the designated second instruction-set, and a first instructing process of transmitting first instruction information to the designated device through the communication interface. The first instruction information is information causing the image processing device to execute the designatable operation identified by the operation ID as obtained in the obtaining process.

According to aspects of the disclosures, there is also provided a non-transitory computer-readable recording medium storing a first instruction-set of computer-readable instructions for a terminal device having a memory, an input interface, a communication interface, and a controller, the memory storing a second instruction-sets which can be started by the first instruction-set, the second instruction-set being configured to instruct an image processing device, which is capable of executing at least one of a plurality of image processing operations, to execute an image processing operation the second instruction-set encourages a user to designate. The first instruction-set of the computer-readable instructions, when executed by the controller, causing the mobile terminal to perform a first obtaining process of obtaining an operation ID included in designated device information, the designated device information including the operation ID identifying the image processing operation which can be executed by a designated device which is the image processing device the second instruction-set encourages the user to designate, a first determining process of determining whether the operation ID identifying a designatable operation which is one of the image processing operations in the first obtaining process, in response to determination that the operation ID is not obtained, a first designating process to cause the second instruction-set to execute a device designating process of encouraging the user to designate, as the designated device, the image processing device capable of executing the designatable operation from among a plurality of image processing devices capable of communicating with the mobile terminal through the communication interface, a first receiving process of receiving the user operation to instruct execution of the designatable operation through the input interface with the designate device information including the operation ID of the designatable operation being stored in the memory, and a second instructing process of causing the second instruction-set to execute an operation instructing process to transmit operation instruction information to the designated device through the communication interface. The operation instruction information is information to cause the designated device to execute the designatable operation which is instructed in the first receiving process.

BRIEF DESCRIPTION OF THE ACCOMPANYING DRAWINGS

FIG. 1 schematically shows a system according to an illustrative embodiment of the disclosures.

FIG. 3 shows an example of a program list stored in a memory of the mobile terminal.

FIG. 10A is an example of a menu screen of an OS shown on a display of the mobile terminal.

FIG. 10B is an example of a main screen shown on the display.

DETAILED DESCRIPTION OF THE EMBODIMENT

Hereinafter, referring to the accompanying drawings, an illustrative embodiment of the present disclosures will be described. It is noted that the illustrative embodiment described below is only an example according to aspects of the disclosures and can be modified in various ways without departing from the aspects of the disclosures. For example, the order of steps in various processes, which will be described below, may be changed without departing from the aspects of the disclosures.

Figure 1:
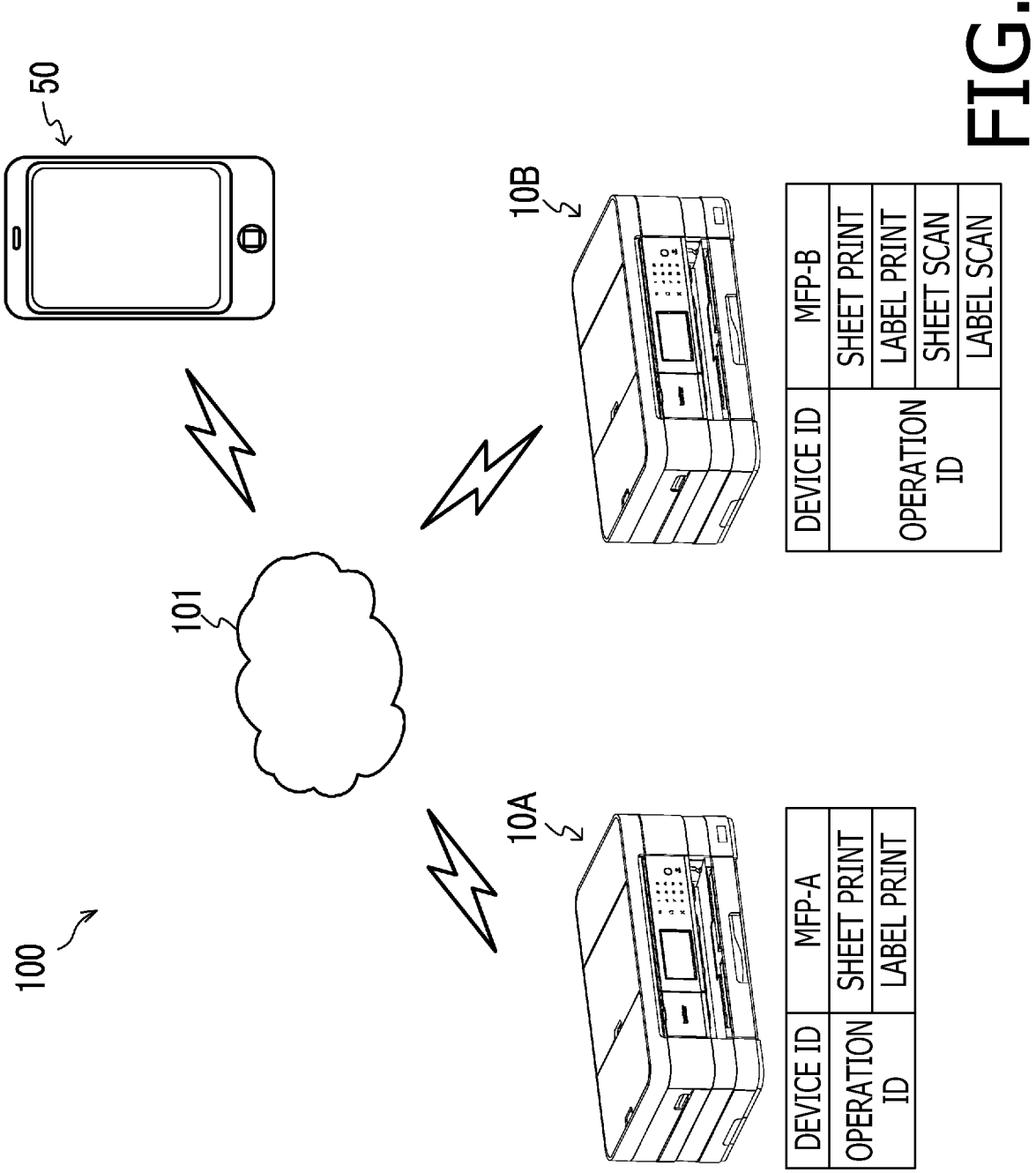

As shown in FIG. 1, a system 100 has an MFP 10A and an MFP 10B (hereinafter, both the MFP 10A and the MFP 10B may occasionally be referred to collectively as MFP's 10), and a mobile terminal 50. The MFP's 10 and the mobile terminal 50 are communicatable with each other through a communication network 101. The communication network 101 may be a wired LAN, a wireless LAN or a combination thereof. Alternatively, the MFP's 10 and the mobile terminal 50 may be connected to each other with a USB cable or the like.

Figure 2A:
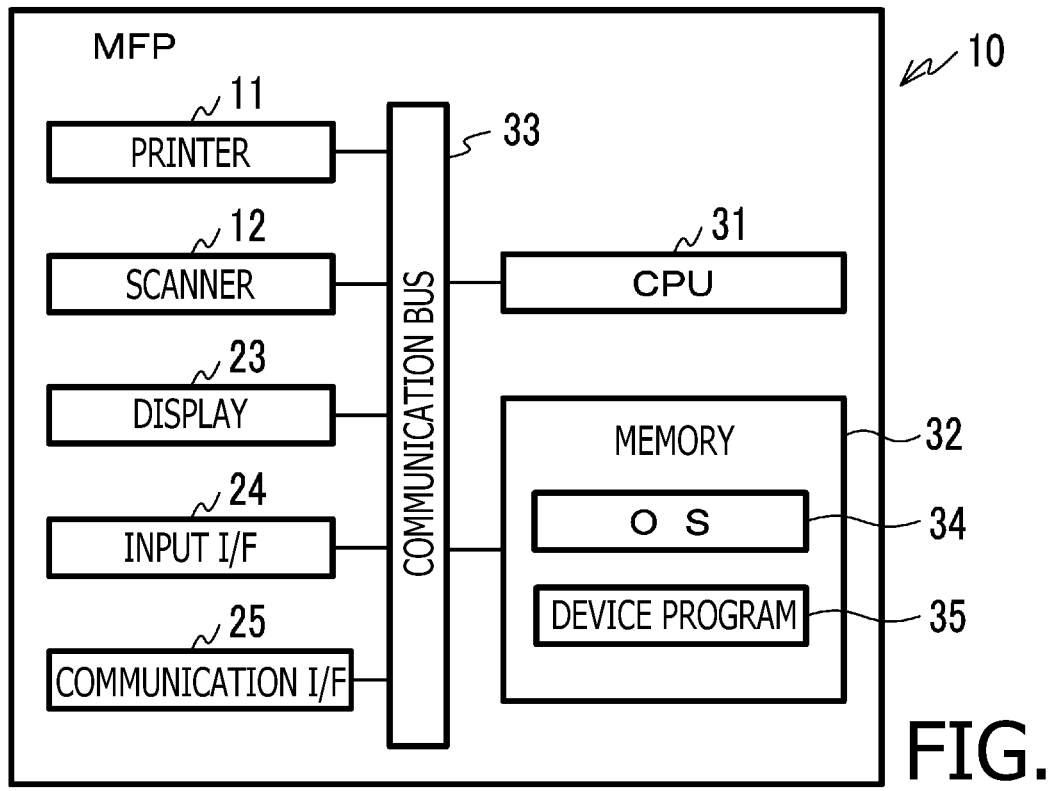
FIG. 2A is a block diagram of an MFP of the system shown in FIG. 1.

The MFP 10 mainly has, as shown in FIG. 2A, a printer 11, a scanner 12, a display 23, an input I/F 24, a communication I/F 25, a CPU 31, and a memory 32. Such components of the MFP 10 are mutually connected through a communication bus 33. It is noted that the MFP 10 is an example of an image processing device.

The printer 11 is hardware configured to execute a printing operation of recording an image represented by image data on a sheet. As a recording method of the printer 11, a well-known inkjet printing method, a well-known electrophotographic imaging method or the like can be employed. The scanner 12 is hardware configured to execute a scanning operation of reading an image recorded on an original and generating image data (hereinafter, referred to as scan data). It is noted that each of the MFP 10A and the MFP 10B may execute at least one operation (e.g., the printing operation or the scanning operation). Further, the operations the MFP's 10A and 10B can execute may be different.

The printing operation is an example of outputting operation of outputting image data which is obtained from the mobile terminal 50. The scanning operation is an example of an inputting operation of generating image data to be inputted into the mobile terminal 50. It is noted that concreate example of image processing operations need not be limited to the above. That is, a facsimile transmitting operation of transmitting image data, by facsimile, to an external device in accordance with a facsimile protocol may be another example of the outputting operation. Further, a downloading operation of receiving image data from a server (not shown) may be another example of the inputting operation.

The display 23 is an LCD, an organic EL display or the like, and has a display screen for displaying various pieces of information.

The input I/F 24 is a user interface acquiring inputting operations by a user. For example, the input I/F 25 has buttons, and configured to transmits a signal corresponding to an operation assigned to an operated button to the CPU 31. Optionally or alternatively, the input I/F 24 may have a film-like touch sensor overlaid on the display screen of the display 23. An operation of the user to designate an object displayed on the display screen of the display 23, and an operation of the user to input letters, character strings and/or numeral strings are examples of a user operation. It is noted that the term "object" here refers to, for example, character strings, icons, buttons, links, radio buttons, check boxes, pull-down menus and the like, which are displayed on the display 23.

When the input I/F 24 is realized as the touch sensor, the input I/F 24 outputs location information indicative of a location on the display screen at which the user has touched. It is noted that the term "touch" includes all the operations to cause an inputting medium to contact the display screen. It is noted that "hovering" or "floating touch" which is an operation to cause the inputting medium to be located close to the display screen so that a distance between the inputting medium and the display screen is very small may be included in the concept represented by the term "touch". Further, the inputting medium could be a finger of the user, a touch pen and the like. An user operation to tap an position of an object displayed on the display screen of the display 23 is an example of a designating operation to designate the object.

The communication I/F 25 is an interface configured to communicate with an external device through the communication network 101. That is, the MFP 10 is configured to transmit various pieces of information to the external device through the communication I/F 25 and/or receive various pieces of information from the external device through the communication I/F 25. A communication procedure employed in the communication I/F 25 need not be limited to any particular procedure, and Wi-Fi (registered trademark) may be employed, for example. When the MFP 10 and the information processing terminal 50 are connected with the USB cable or the like, the communication I/F 25 may be a USB interface configured such that a USB cable can be detachably attached thereto.

The CPU 31 is configured to control an entire operation of the MFP 10. The CPU 31 is configured to retrieve programs from the memory 32 based on various pieces of information input through the input I/F 24 and received from the external device through the communication I/F 25, and execute the same. The CPU 31 and the memory 32 constitute an example of a controller.

The memory 32 stores an OS 34 and the device program 35. The device program 35 may be a single program or a collection of multiple programs. The memory 32 stores data and/or information which are necessary when the device program 35 is executed. The memory 32 may be configured, for example, by a RAM, a ROM, an EEPROM, an HDD, a portable recording medium such as a USB memory which can be detachably attached to the MFP 10, a buffer provided to the CPU 31, and/or any combination thereof.

The memory 32 may be a computer-readable storage medium. The computer-readable storage medium is a non-transitory medium. The non-transitory medium includes a recording medium such as a CD-ROM, a DVD-ROM and the like. It is noted that the non-transitory medium is also a tangible medium. It is noted that electrical signal carrying programs downloaded from a server on the Internet or the like is a computer-readable signal medium which is a kind of the computer-readable medium, but is not the non-transitory computer-readable storage medium. The above applies to a memory 62 of the information processing terminal 50 described later.

An MIB (abbreviation of a Management Information Base) is configured to store device information as shown in FIG. 1. The device information includes a device ID identifying an individual MFP 10 and an operation ID identifying an image processing operation which can be executed by the MFP 10 identified by the device ID. It is noted that any format (e.g., text format, binary format or the like) can be used for the device ID as far as the MFP 10A or 10B can be identified uniquely on the communication network 101. So are the operation ID, a program ID (described later) and a data ID (described later).

As shown in FIG. 1, the MFP 10A is identified by the device ID "MFP-A", which is capable of executing operations identified by the operation ID's "SHEET PRINT" and "LABEL PRINT". Further, the MFP 10B is identified by the device ID "MFP-B", which is capable of executing operations identified ty the operation ID's "SHEET PRINT", "LABLE PRINT", "SHEET SCAN" and "LABEL SCAN".

The operation ID "SHEET PRINT" identifies a printing operation (hereinafter, simply referred to as a sheet printing operation) to record an image on a recording sheet, which is an example of a recording medium. The operation ID "LABEL PRINT" identifies a printing operation (hereinafter, simply referred to as a label printing operation) to record an image on a surface of a label (e.g., a label for a CD-ROM, a DVD-ROM or the like), which is an example of a recording medium. Thus, each of the MFP's 10A and 10B has hardware for conveying not only the printing sheet but the label to a recording position at which an image is recorded on the recording medium.

The operation ID "SHEET SCAN" identifies a scanning operation (hereinafter, simply referred to as a sheet scan operation) to generate scan data by reading an image recorded on the recording sheet. The operation ID "LABEL SCAN" is an operation to generate scan data (hereinafter, simply referred to as a label scanning operation) by reading an image recorded on a label. That is, the MFP 10A has only a function of a printer and does not have a function of a scanner 12. The MFP 10B has the scanner 12 and has an image processing function of identifying a center of a label on an image represented by the scan data.

Figure 2B:
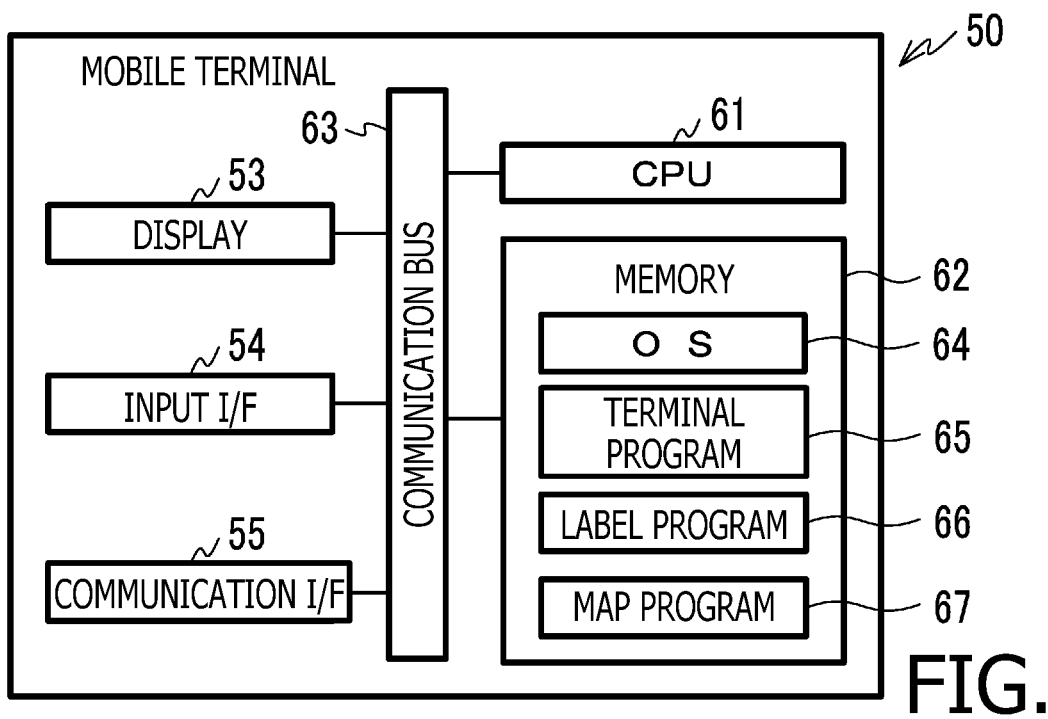
FIG. 2B is a block diagram of a mobile terminal of the system shown in FIG. 1.

As shown in FIG. 2B, the mobile terminal 50 mainly has a display 53, an input I/F 54, a communication I/F 55, a CPU 61, a memory 62, a communication bus 63. The display 53, the input I/F 54, the communication I/F 55, the CPU 61, the memory 62 and the communication bus 63 of the mobile terminal 50 have the similar configuration as the display 23, the input I/F 25, the communication I/F 25, the CPU 31, the memory 32 and the communication bus 33 of the MFP 10, respectively. Therefore, description of the display 53, the input I/F 54, the communication I/F 55, the CPU 61, the memory 62 and the communication bus 63 of the mobile terminal 50 will be omitted. It is noted that the CPU 61 and the memory 62 constitute an example of the controller.

The mobile terminal 50 may be realized as, for example, a smartphone or a tablet terminal. Preferably, the display 53 of the mobile terminal 50 is configured such that the size of the display screen is 12 inches or less, and more preferably, 8 inches or less. Further, it is preferable that the input I/F 54 of the mobile terminal 50 is a touch sensor overlaid on the display screen of the display 53. According to the illustrative embodiment, the memory 62 stores an OS 64, a terminal program 65, a label program 66 and a map program 67.

The OS 64 may be Android™ OS, iOS™, Windows Phone™ Operating System, iOS™, Windows Phone™ Operating System, or the like. The OS 64 is configured to execute multiple programs, which are installed in the mobile terminal 50, parallelly. That is, for example, the multiple programs may be executed in accordance with a time division multiplexing method so that they are executed virtually in parallel. The OS 64 is configured such that one of the parallelly running multiple programs in a foreground, while the other in a background.

It is noted that when a program is running in the "foreground", a screen to be displayed when the program is running is displayed in a most part of the display area of the display 53. When a program is running in the "background", a screen to be display when another program is running is displayed in the most part of the display are of the display 53. Thus, the mobile terminal 50 is configured such that only a screen which is to be displayed when a program running in the foreground among multiple programs which are running parallelly on the display.

The terminal program 65 causes the MFP 10 which is connected through the communication I/F 55 to execute the image processing operation. It is noted that the terminal program is configured to require the user to designate the image processing operation to be executed by the MFP 10 through the input I/F 54, or another program installed in the mobile terminal 50 may require the user to designate the image processing operation. As above, the terminal program 65 is not a so-called device driver which simply causes the MFP 10 to execute an image processing operation in accordance with an instruction transmitted from another program.

The label program 66 has a function of obtaining the scan data, which is generated in the label scan operation, from the MFP 10 through the terminal program 65, and generating label image data indicative of an image to be recorded on the label based on the obtained scan data. Further, the label program has a function of causing the MFP 10, through the terminal program 65, to execute the label printing operation in which the label image data is generated in accordance with user operations input through the input I/F 54 and subject to be printed.

The map program 67 has a function of extracting a part of map image data, which is obtained from a server (not shown), in accordance with user operations through the input I/F 54, and causing the MFP 10 to execute a sheet printing operation using the map image data as extracted. Although not shown, the mobile terminal 50 also stores a name card program having a function of obtaining the scan data generated by the sheet scan operation from the MFP 10 through the terminal program 65, and extracts character strings (e.g., a name, a company name, a telephone number, an email address and the like) included in the obtained scan data as text data.

It is noted that the terminal program 65 is configured to start the label program 66 and the map program 67, which are installed in the mobile terminal 50, as so-called plug-ins. Similarly, the label program 66 and the map program 67 are configured to start the terminal program 65 installed in the mobile terminal 50 as a so-called plug-in. It is noted that the plug-in is an example of the subordinate program. It is further noted that the subordinate program is a program separate from a start-source program which starts the subordinate program, and runs independently from the program which starts the subordinate program. It is further noted that the subordinate program runs in the same mobile terminal 50 in which the start-source program runs.

The subordinate program is started by, for example, an API supplied by the OS 64 (hereinafter, referred to as a starting API). The start-source program executes the starting API by, for example, designating the program ID of the subordinate program as an argument. In response to the starting API being executed, the OS 64 starts the subordinate program which is identified by the designated program ID. Then, the started subordinate program executes a particular operation, and delivers results of the particular operation to the start-source program as a return value of the starting API. It is noted that the subordinate program may be started by a sharing function realized by the OS 64.

The memory 62 is capable of storing a program list, an example of which is schematically shown in FIG. 3. The program list includes one or more program records. The program record is stored in the memory 62 when, for example, the terminal program 65 is installed in the mobile terminal 50. Each program record corresponds to one of the multiple programs which can be started by the terminal program 65. As shown in FIG. 3, the program record includes a program ID, an install flag, a PI function list and contents information.

The program ID identifies a program which can be started by the terminal program 65. Specifically, the label program 66 is identified by the program ID "LABEL", the map program 67 is identified by the program ID "MAP", and the name card program is identified by the program ID "NAME CARD". The install flag indicates whether the program identified by the corresponding program ID (i.e., the program ID of the same record) is installed in the mobile terminal 50. According to the illustrative embodiment, the install flag is set to a first value "YES" which indicates that the program has been installed, or a second value "NO" which indicates that the program is not installed.

The PI function list is information indicating a designatable operation which the program identified by the program ID can instruct the MFP 10, through the terminal program 65, to execute. That is, each of the label program 66, the map program 67 and the name card program is capable of instructing the MFP 10, through the terminal program 65, to execute one or more designatable operations. The PI function list indicates an operation ID of the designatable operation (hereinafter, referred to as a designatable operation ID). Specifically, the PI function list includes a third value "ON" indicating the designatable operation or a fourth value "OFF" indicating the non-designatable operation for each of the multiple operation ID's.

As an example, the PI function list may be defined in a so-called manifest file which is managed by an Android® OS. For another example, the terminal program 65 may execute a function provided by the subordinate program, and obtain the PI function list from the subordinate program as a return value of the function.

The contents information includes the operation ID and the URI (abbreviation of Uniform Resource Identifier) which are obtained as return values of the starting API from a program identified by the corresponding program ID. The operation ID is information for identifying an image processing operation to be executed by the MFP 10. The URI is an example of data ID for identifying image data subject to the image processing operation which is identified by the corresponding operation ID. The contents information is registered with the program record by the terminal program 65 in an instruction receiving process (described later). The program record may include a plurality of pieces of contents information, or may not include the contents information.

Further, although not shown in the drawings, the memory 62 is configured to store designated device information. The designated device information is device information which is stored in an MIB of the MFP 10 designated in the device selection process (hereinafter, referred to as designated device). When the MFP 10 is not designated, the designated device information is not stored in the memory 62.

<Operation of System>

Figure 4:
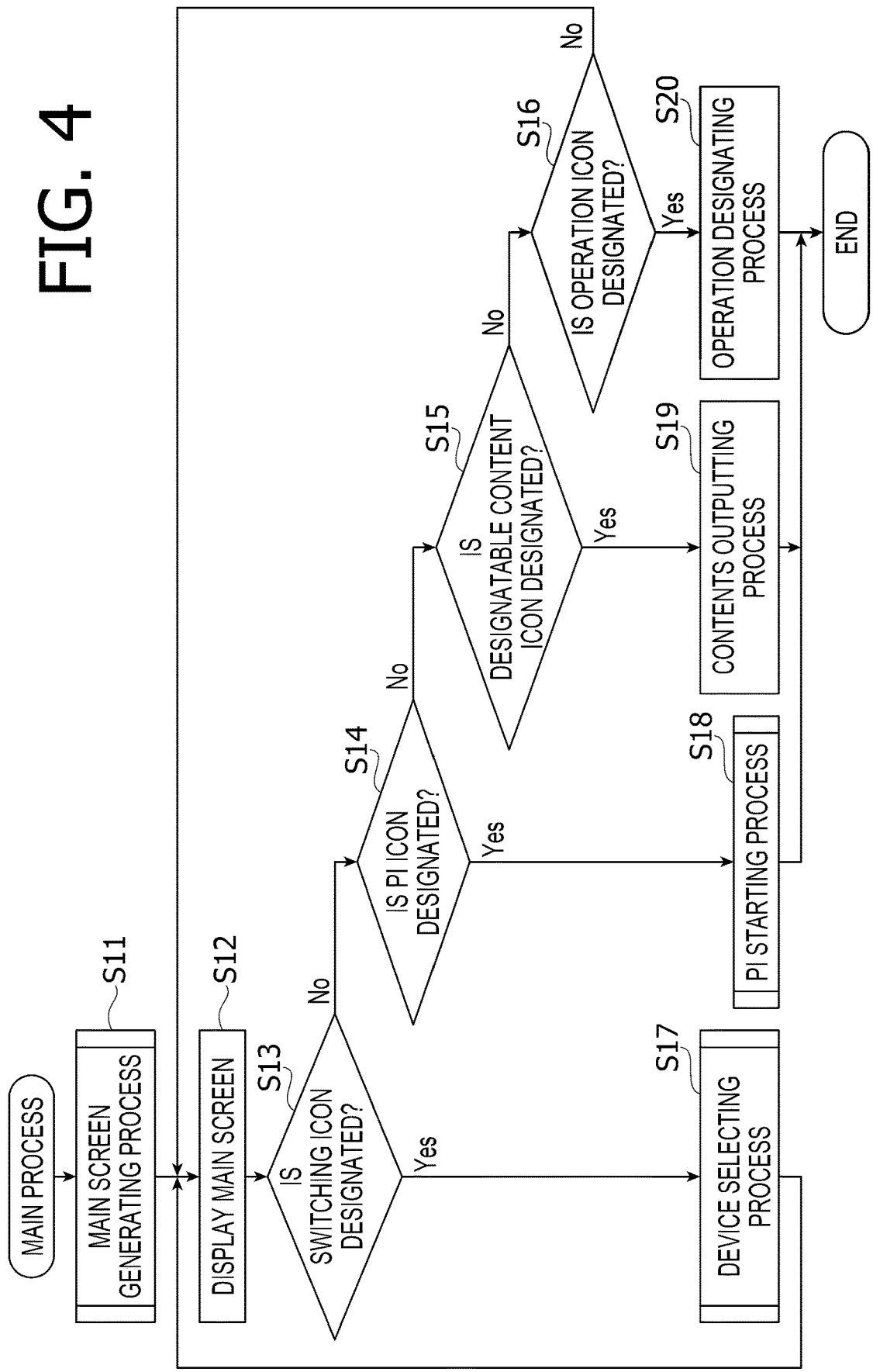
FIG. 4 is a flowchart illustrating a main process.

Hereinafter, referring to FIGS. 4-9, an operation of the system 100 according to the illustrative embodiment will be described. For the sake of explanation, it is assumed that, when a main process shown in FIG. 4 is started, the device information of the MFP 10A has been stored in the memory 62 as the designated device information.

It is noted that the flowcharts shown in the drawings and described in the specification basically show processes executed by the CPU's 31 and 61 in accordance with instructions described in programs. Accordingly, processes to "determine", "extract", "select", "calculate", "identify", "control" and the like, which are described hereinafter, express those executed by the CPU 31 or the CPU 61. It is also noted that the processes executed by the CPU's 31 and 61 include control of hardware through the OS's 34 and 64. Further, it is noted that the term "data" in the specification is expressed by bit strings which can be read by a computer. It is further noted that two or more pieces of data having different formats but substantial meanings are the same will be treated as the same data. So is the term "information".

The OS 64 of the mobile terminal 50 displays a menu screen shown in FIG. 10A on the display 53. The menu screen includes multiple program icons 111, 112, 113 and 114. The program icons 111-114 respectively correspond to programs installed in the mobile terminal 50. For example, the program icon 111 corresponds to the terminal program 65, the program icon 112 corresponds to the label program 66, and the program icon 113 corresponds to the map program 67. The OS 64 receives, through the input I/F 54, the user operation to designate one of the program icons 111-114.

In an exemplary situation, in response to receipt of designation of the program icon 112 through the input I/F 54, the OS 64 starts the label program 66 and executes the same in the foreground. The label program 66 started here executes a label PI process, which will be described later. In another exemplary situation, in response to receipt of designation of the program icon 111 through the input I/F 54, the OS 64 starts the terminal program 65 and executes the same in the foreground. In the following description, the latter situation will be described in detail.

When started by the OS 64, the terminal program 65 of the mobile terminal 50 executes a main screen generating process (S11). The main screen generating process is a process of generating a main screen as shown in FIG. 10B. Specifically, the main screen generating process determines whether icons respectively corresponding to subordinate programs installed in the mobile terminal 50 are to be included in the main screen shown in FIG. 10B.

Figure 5:
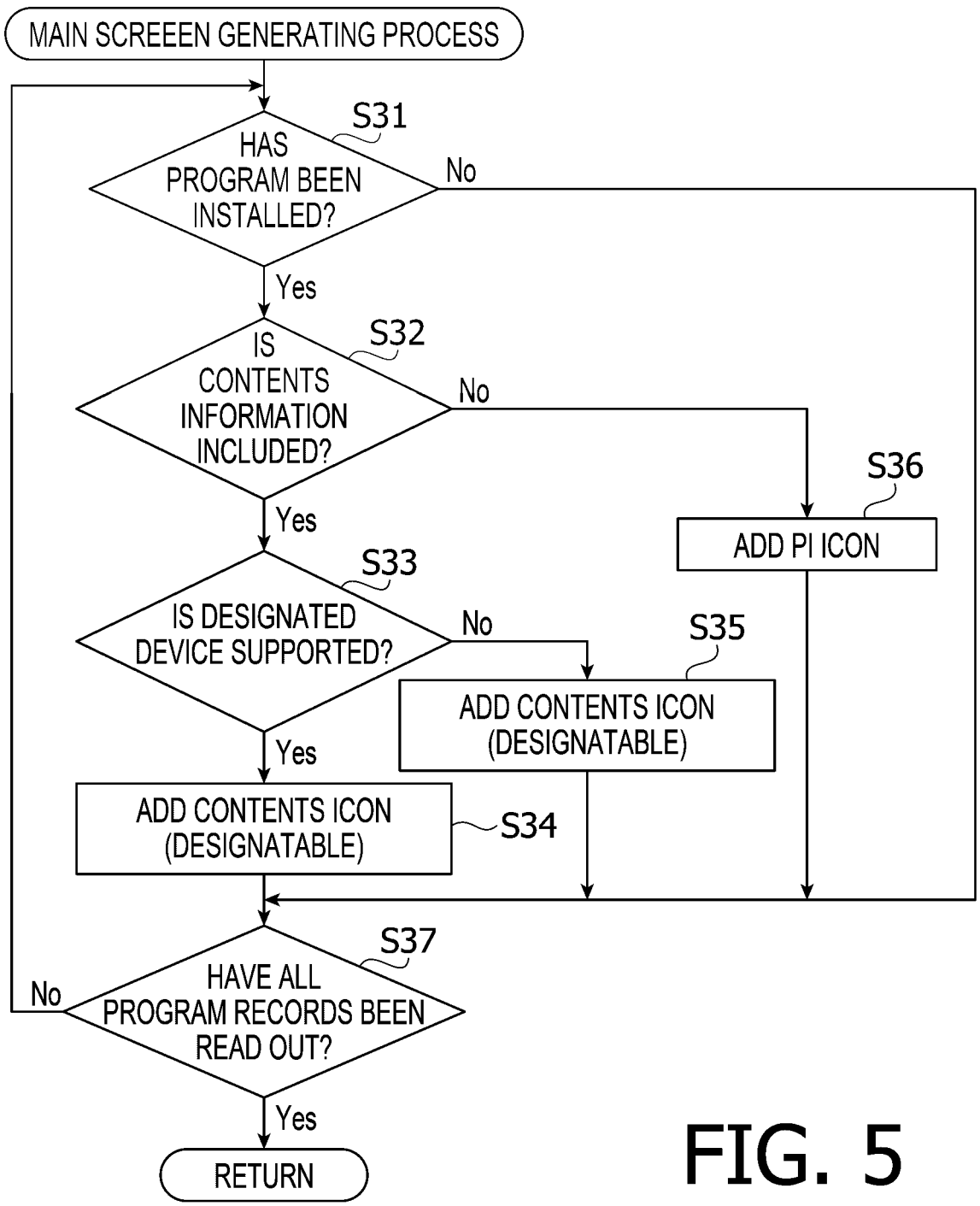
FIG. 5 is a flowchart illustrating a main screen generating process.

Referring to FIG. 5, the main screen generating process will be described in detail. The terminal program 65 executes a process of S31-S36 for each of the program records included in the program list (S37: NO). Specifically, the terminal program 65 determines a set value of the install flag of the program record (S31). Further, the terminal program 65 determines whether the program record includes contents information (S32). Furthermore, the terminal program 65 determines whether the designated device information stored in the memory 62 includes the operation ID of the contents information (S33). Then, depending on decision results in S31-S33, the terminal program 65 determines icons of the subordinate programs respectively corresponding to the program records.

The terminal program 65 firstly retrieves a program record on line one of the program list shown in FIG. 3. In response to determination that the install flag being set to the first value "YES" (S31: YES) and no contents information being included (S32: NO), the terminal program 65 determines that a PI icon 123 corresponding to the label program 66 is to be included in the main screen as shown in FIG. 10B (S36).

The PI icon 123 is an example of a first object which corresponds to a subordinate program to which no contents information is associated. As the PI icon 123, an image indicating the label program 66 is used. It is noted that any image which can be recognized, by the user of the mobile terminal 50, as a name of the label program, an abbreviation thereof, a logo mark or the like can be used as the PI icon 123.

Next, the terminal program 65 retrieves a program record on line two of the program list shown in FIG. 3. In response to determination that the install flag being set to the first value "YES" (S31: YES), contents information being included (S32: YES), and the designated device information including the operation ID "sheet print" (S33: YES), the terminal program 65 determines that a contents icon 124 corresponding to the map program 67 is to be included in the main screen as shown in FIG. 10B (S34) such that the contents icon 124 is designatable by the user.

The contents icon 124 may be a so-called thumbnail image by processing image data indicated by the URI. It is noted that "processing" of image may include trimming of image data indicated by the URI, lowering a resolution of an image represented by image data, or the like. Further, the contents icon 124 may be a budge image indicating the number of pieces of contents information included in the program record. It is also noted that the budge image may be arranged at a position around (e.g., at an upper-right portion of) the PI icon corresponding to the subordinate program.

Although not shown in the drawings, in response to determination that the install flag being set to the first value "YES" (S31: YES), contents information being included (S32: YES), and the designated device information not including the operation ID "sheet print" (S33: NO), the terminal program 65 determines that a contents icon 124 corresponding to the map program 67 is to be included in the main screen such that the contents icon 124 is not designatable by the user (S35). It is note that a state of the icon which is not designatable may be a gray-out state on the main screen.

In response to determination that the install flag of the program record on line three of the program list shown in FIG. 3 being set to the second value "NO" (S31: NO), the terminal program 65 determines not to include an icon corresponding to the name card program in the main screen. Then, in response to execution of the process of S31-S46 for all the program records (S37: YES), the terminal program 65 terminates the main screen generating process.

In FIG. 4, the terminal program 65 displays the main scree shown in FIG. 10B on the display 53 (S12). The main screen is an example of a first screen which includes operation icons 121 and 122, the PI icon 123, the contents icon 124 in the designatable state, and a switching icon 125. Then, the terminal program 65 waits for receipt of the user operation with respect to the main screen through the input I/F 54 (S13-S16). It is noted that S12 is an example of a first displaying process, and S13-S16 show an example of a first receiving process.

The operation icon 121 corresponds to an execution instruction of the sheet printing operation. The operation icon 122 corresponds to an execution instruction of the sheet scan operation. The PI icon 123 and the contents icon 124 are icons determined to be included in the main screen in the main screen generating process. The switching icon 125 corresponds to a switching instruction to switch the designated device. On the switching icon 125, the device ID included in the designated device information (e.g., "MFP-A") is indicated (see FIG. 10B). If not designated device information is stored in the memory 62, a letter string "UNSELECTED", which indicates that the designated device has not yet been selected, is indicated on the switching icon 125.

Next, in response to receipt of, for example, designation of the switching icon 125 through the input I/F 54, the terminal program 65 executes the device selecting process (S17). It is noted that, in the device selectin process executed in S17, devices meats a search criteria are searched. The search criteria is, for example, "all the MFP's which are communicatable through the communication network 101".

Figure 6:
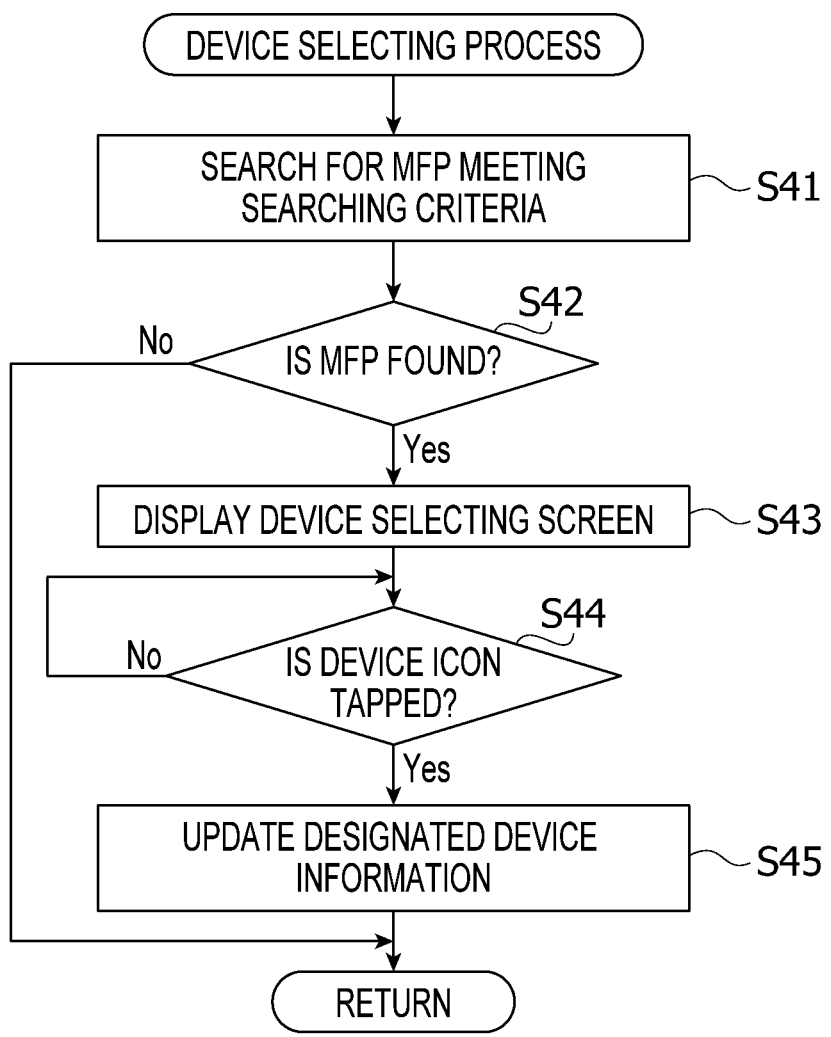
FIG. 6 is a flowchart illustrating a device selecting process.

Next, referring to FIG. 6, the device selecting process will be described. Firstly, the terminal program 65 searches for multiple MFP's 10 which are communicatable through the communication I/F 55 using, for example, a SNMP (abbreviation of simple network management protocol) in S41.

Specifically, the terminal program 65 broadcasts transmission request information to the communication network 101 through the communication I/F 55. Then, the terminal program 65 receives the device information, which are transmitted by the MFP's 10A and 10B in response to the transmission request information, through the communication I/F 55. Thus, the terminal program 65 identifies the MFP's 10A and 10B, which are transmission sources of the device information, as the communicatable MFP's 10. It is noted that the above mothed of searching the communicatable MFP's 10 is only an example, and any other well-known method may be used.

Figures 11A, 11B:
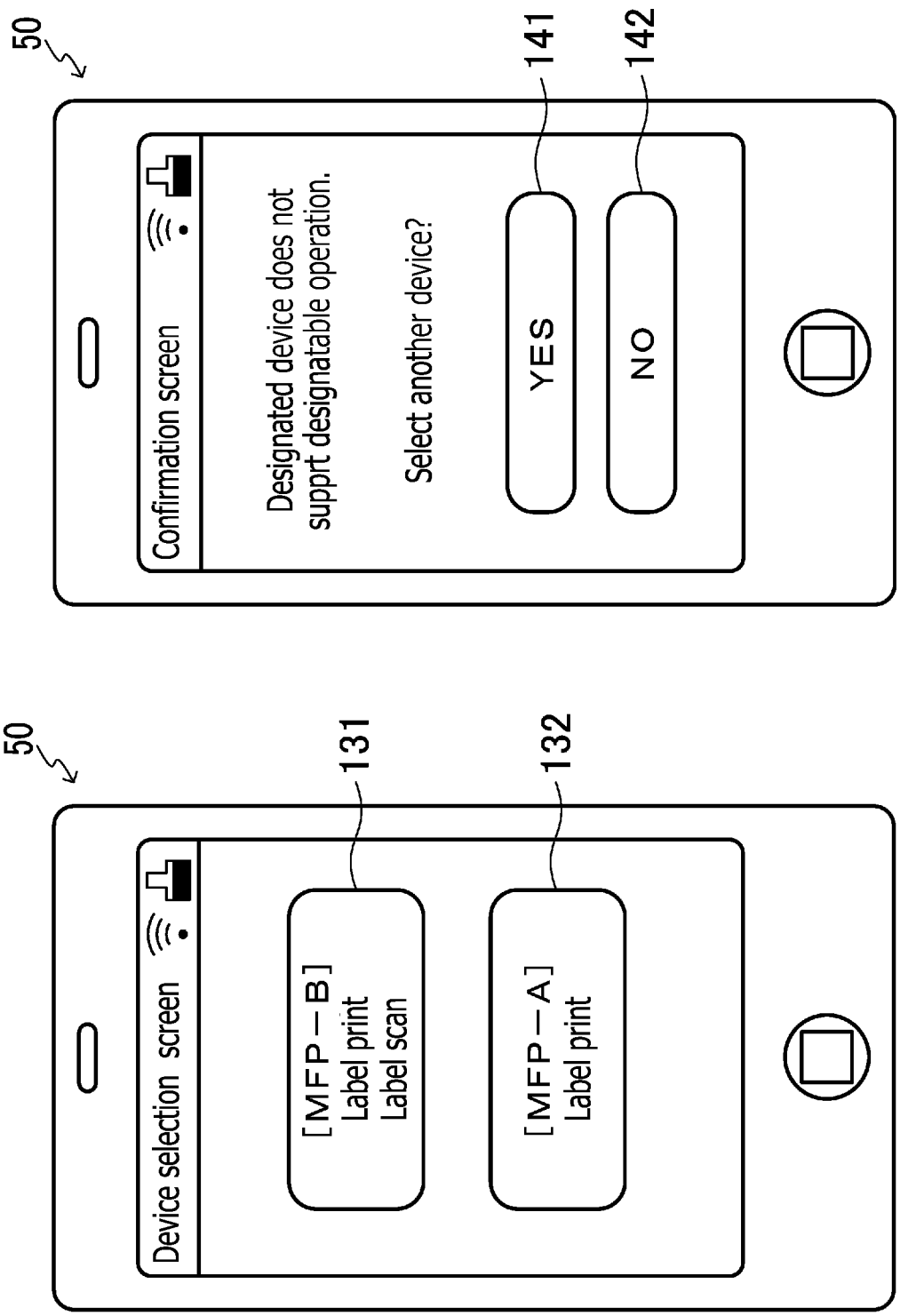
FIG. 11A is an example of a device selection screen shown on the display.
FIG. 11B is an example of a confirmation screen shown on the display.

Next, the terminal program 65 determines whether an MFP 10 meeting the search criteria has been found in S41 (S42). Then, in response to finding of MFP's 10A and 10B (S42: YES), the terminal program 65 displays the device selection screen as shown in FIG. 11A on the display 53 (S43). Then, the terminal program 65 receives the user operation with respect to the device selection screen through the input I/F 54 (S44). It is noted that S43 is an example of a second displaying process, and S44 is an example of a second receiving process.

The device selection screen includes device icons 131 and 132 (see FIG. 11A). The device icons 132 and 131 respectively correspond to the MFP's 10A and 10B, which were found in S41. On the device icons 131 and 132, the device ID's of the corresponding MFP's 10A and 10B are indicated, respectively. In the example shown in FIG. 11A, a character string "Labe print" is also indicated on the device icon 132, and character strings "Label print" and "Label scan" are also indicted on the device icon 131. It is noted that the character strings such as "Label print" and "Label scan" may not be indicated on the device icons 131 and 132.

Next, in response to receipt of designation of, for example, the device icon 131 through the input I/F 54 (S44: YES), the terminal program 65 stores the device information received from the MFP 10B, which corresponds to the device icon 131, in the memory 62 as the designated device information (S45). It is noted that S45 is an example of a first storing process. When the memory 62 has already stored the designated device information, the terminal program 65 overwrites the stored designated device information with newly received designated device information. On the other hand, in response to an MFP 10 not being found in S41 (S42: NO), the terminal program 65 skips S43-S45, and terminates the device selecting process.

After the device selecting process is finished, the terminal program 65 displays the main screen on the display 53 (FIG. 4, S12). In the main screen after the device icon 131 has been selected, the designated device ID "MFP-B" is indicated on the switching icon 125. Next, in response to receipt of designation of, for example, the PI icon 123 through the input I/F 54 (S14: YES), the terminal program 65 executes a PI starting process (S18). The PI starting process is a process of starting a label program 66 corresponding to the designated PI icon 123 (hereinafter, referred to as a designated program).

Figure 7:
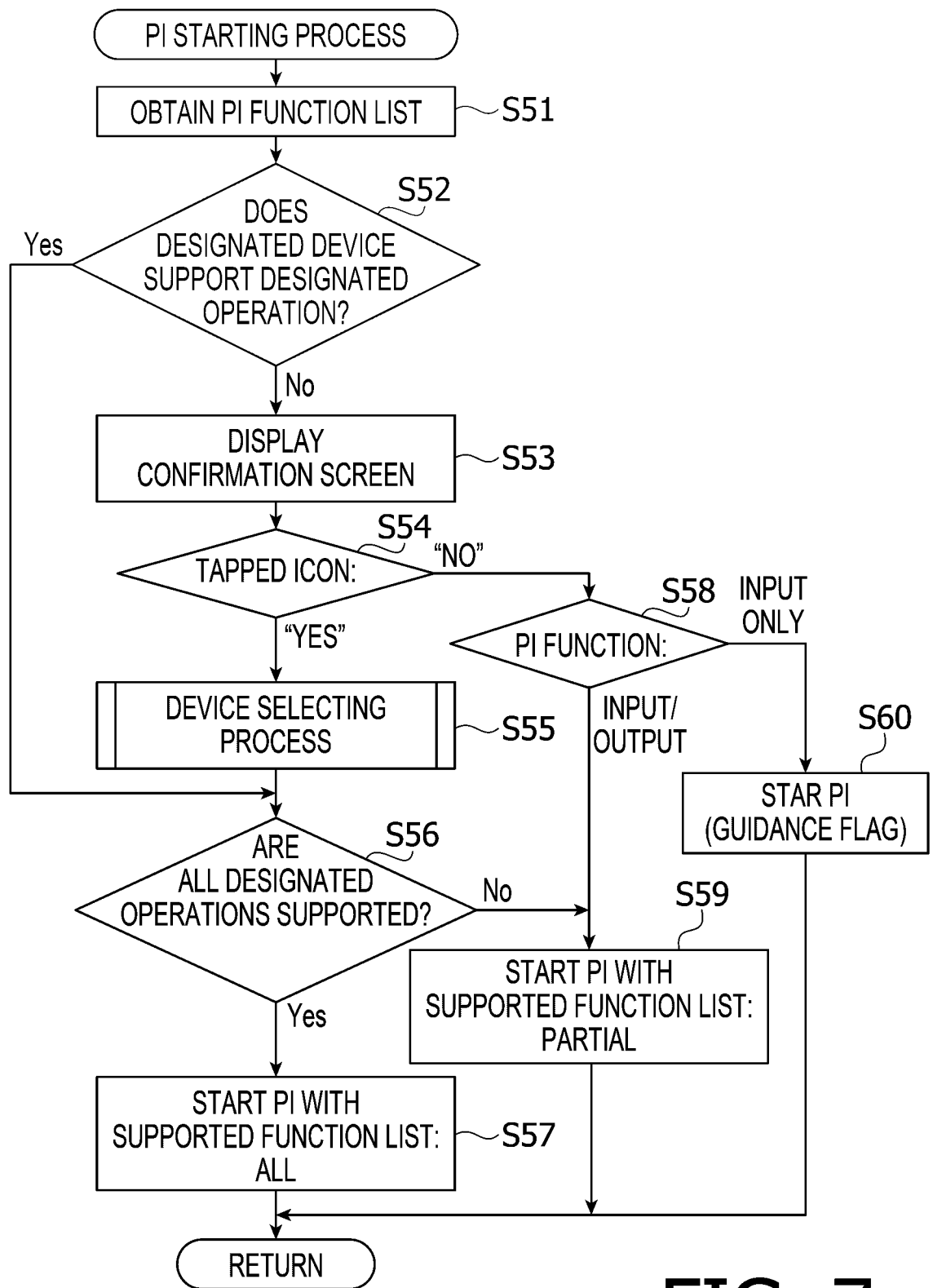
FIG. 7 is a flowchart illustrating a PI starting process.

Hereinafter, referring to FIG. 7, the PI starting process will be described in detail. When the PI starting process is started, the terminal program 65 retrieves a PI function list of the program record corresponding to the PI icon 123 from the program list (S51). Next, the terminal program 65 determines whether the designated device supports the designatable operation indicated in the retrieved PI function list (S52). In other words, the terminal program 65 determines whether the designated device information including the designatable operation indicated in the PI function list is stored in the memory 62 (S52). It is noted that S52 is an example of a first determining process.

When it is determined that the designated device supports at least a part of the designatable operation (S52: YES), the terminal program 65 skips S53-S55, and extracts an operation ID, from among the multiple designatable operation ID's "LABEL PRINT" and "LABEL SCAN", included in the designated device information (S56). Then, the terminal program 65 calls the starting API with designating the program ID and the support function list of the label program as arguments (S57, S59). It is noted that S56 is an example of an extracting process, and S57, S59 and S60 (described later) are examples of a starting process.

The support function list is a list of the operation ID extracted in S56. For example, when the MFP 10A is the designated device, the terminal program 65 extracts only a part of the designatable operation ID "LABEL PRINT", designates the function list indicating the extracted operation ID "LABEL PRINT" as an argument of the starting API (S56:NO; S59). For another example, when the MFP 10B is the designated device, the terminal program 65 extracts all the designatable operation ID's "LABEL PRINT" and "LABEL SCAN", and designates the support function list indicating all the designatable operation ID's as the argument of the starting API (S56: YES; S57).

When it is determined that the designated device supports none of the designatable operations (S52: NO), the terminal program 65 displays a confirmation screen as shown in FIG. 11B on the display 53. It is noted that, when the designated device supports none of the designatable operation ID's, the designated device information stored in the memory 62 includes one of the designatable operation ID's, or the memory 62 does not store the designated device information.

The confirmation screen (see FIG. 11B) includes a message "Designated device does not support designatable operation. Select another device?", a [YES] icon 141 and a [NO] icon 142. After displaying the confirmation screen, the terminal program 65 receives the user operation with respect to the confirmation screen through the input I/F 54 (S54). It is noted that S54 is an example of a third receiving process.

In response to receipt of designation of the [YES] icon 141 through the input I/F 54 (S54: YES), the terminal program executes the device selecting process (S55). The terminal program 65 executes steps S56 onwards, with use of the designated device information newly stored in the memory 62. That is, the terminal program 65 executes the steps S56 onwards with the designated device information including the designatable operation ID being stored in the memory 62. It is noted that designation of the [YES] icon 141 is an example of a first instructing process.

It is noted that the searching criteria of the device selecting process executed in S55 is "MFP's capable of communication through the communication network and capable executing at least one of the designatable operations". In the following description, detailed description regarding processes which are similar to those in the device selecting process executed in S17 will be omitted, and differences therebetween will be mainly described.

For example, when the terminal program 65 receives device information from the MFP's 10A and 10B in S41, the terminal program 65 may extract the MFP of which device information includes at least one designatable operation ID. For another example, the terminal program 65 may broadcast the transmission request information including the designated device ID in S41. Then, the MFP's 10A and 10B may transmit the device information through the communication I/F 25 only when the device information stored in the memory 32 includes the designated device ID. As a result, the terminal program 65 receives only the device information which includes at least one of the designatable operation ID's. The processes above are examples of a first searching process.

Next, the terminal program 65 displays the device icon 131 corresponding to the MFP 10B which can execute all the designatable operations with a higher priority than the device icon 312 corresponding to the MFP 10A which can execute only a part of the designatable operations (S43), as shown in FIG. 11A. Further, the terminal program 65 notifies the designatable operations which can be executed by the MFP 10A and MFP 10B through the corresponding device icons 132 and 131, respectively.

As one exemplary embodiment, to "display with higher priority" may mean to display the device icon 131 at an earlier order in an arranging direction (e.g., in up-down direction) in comparison with the device icon 132. In another exemplary embodiment, to "display with higher priority" may mean that only the device icon 131 is displayed when the MFP 10B which can execute all the designatable operations is found, while the device icon 132 is displayed when the MFP 10B which can execute all the designatable operations is not found. It should be noted that to "notify the designatable operations through the device icon 131/132" means, for example, information indicating the designatable operations which can be executed by the corresponding MFP 10A/10B (e.g., text indicating the name of the operation or the operation ID, an image indicating the operation) is indicated on the device icon 131/132.

In response to receipt of designation of the [NO] icon 142 through the input I/F 54 (S54: NO), the terminal program 65 determines whether the PI function list received in S51 includes the operation ID of the output operation (S58). That is, the terminal program 65 determines whether the label program 66, which is the designated program, can execute the outputting operation. It is noted that designation of the [NO] icon 142 is an example of a second instructing process. S58 is an example of a second determining process.

Next, when it is determined that the label program 66 can execute the outputting operation "label print operation" (S58: INPUT/OUTPUT), the terminal program 65 starts the label program 66 with designating a support function list indicating the operation ID "Label print" of the outputting operation as the argument of the starting API (S59). When it is determined that the designated program cannot execute the outputting operation (S58: INPUT ONLY), the terminal program 65 starts the designated program with designating a guidance flag as the argument of the starting API instead of the support function list (S60). The guidance flag represent information indicating that a designated device capable of executing the designatable operation is not designated.

In response to the starting API being executed (S57, S59, S60), the OS 64 starts the label program 66, and executed the label program 66 in the foreground. Further, the OS 64 executes the terminal program 65 which has been executed in the foreground in the background. The label program 66 which is started by the starting API executes a label PI process.

Figure 8:
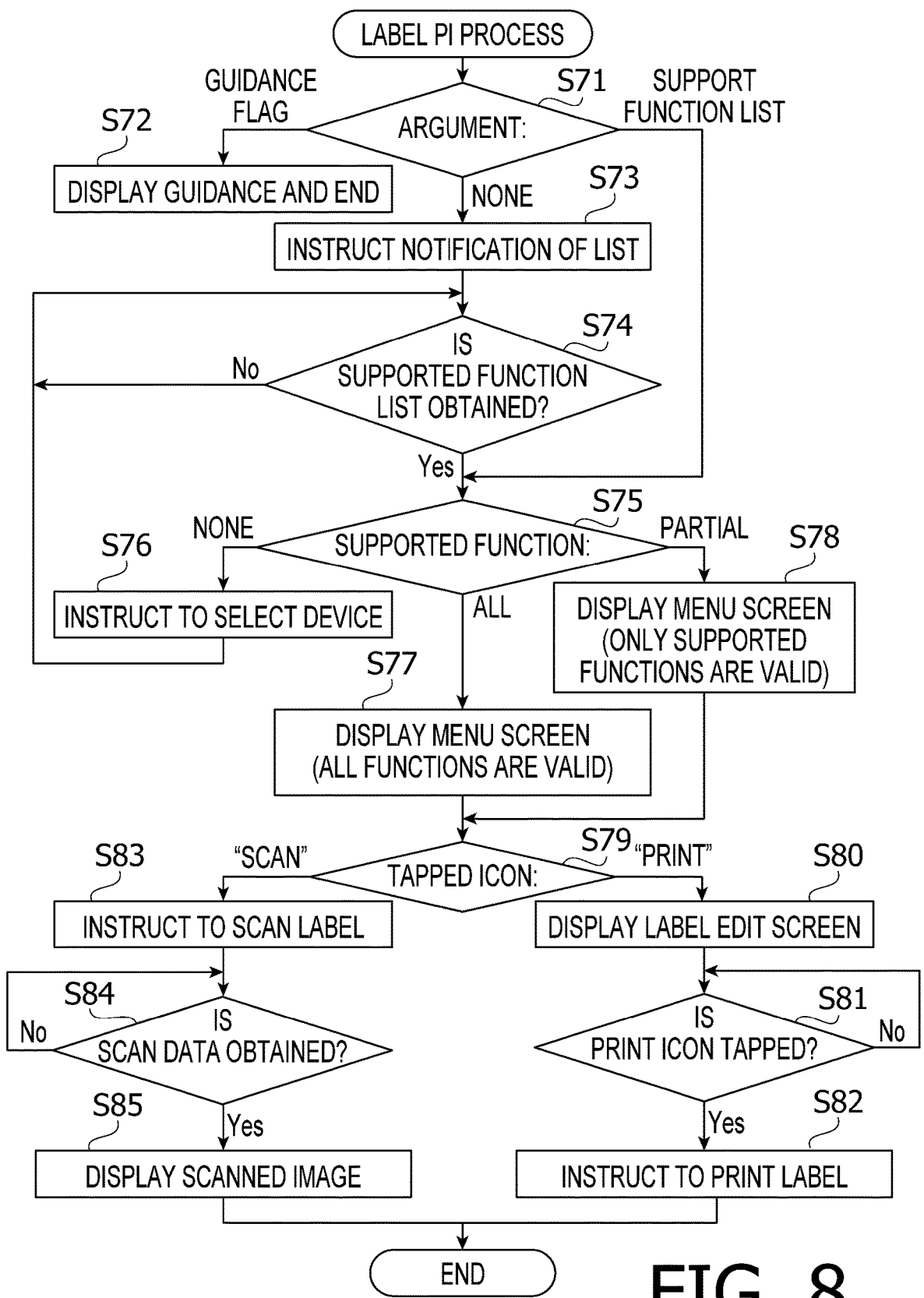
FIG. 8 is a flowchart illustrating a label PI process.

Hereinafter, referring to FIG. 8, the label PI process will be described in detail. In response to obtaining the guidance flag as the argument of the starting API (S71: Guidance Flag), the label program 66 displays a guidance screen (not shown) on the display 53 (S72), and terminates the label PI process. The guidance screen is for notifying the following processes cannot be executed since, for example, the designated device cannot execute the designatable operation. Then, the OS 64 executes the terminal program 65, which has been executed in the background process, in the foreground process. Then, the terminal program 65, which is switched to be executed in the foreground, executes, for example, steps S11 onwards.

Further, in response to obtaining the support function list as the argument of the starting API (S71: support function list), the label program 66 skips S73-S74, and determines whether the designated device supports the designatable operations (S75). In other words, the label program 66 determines whether the support function list obtained in S71 includes the designated device ID's "LABEL PRINT" and "LABEL SCAN" (S75).

Figures 12A, 12B:
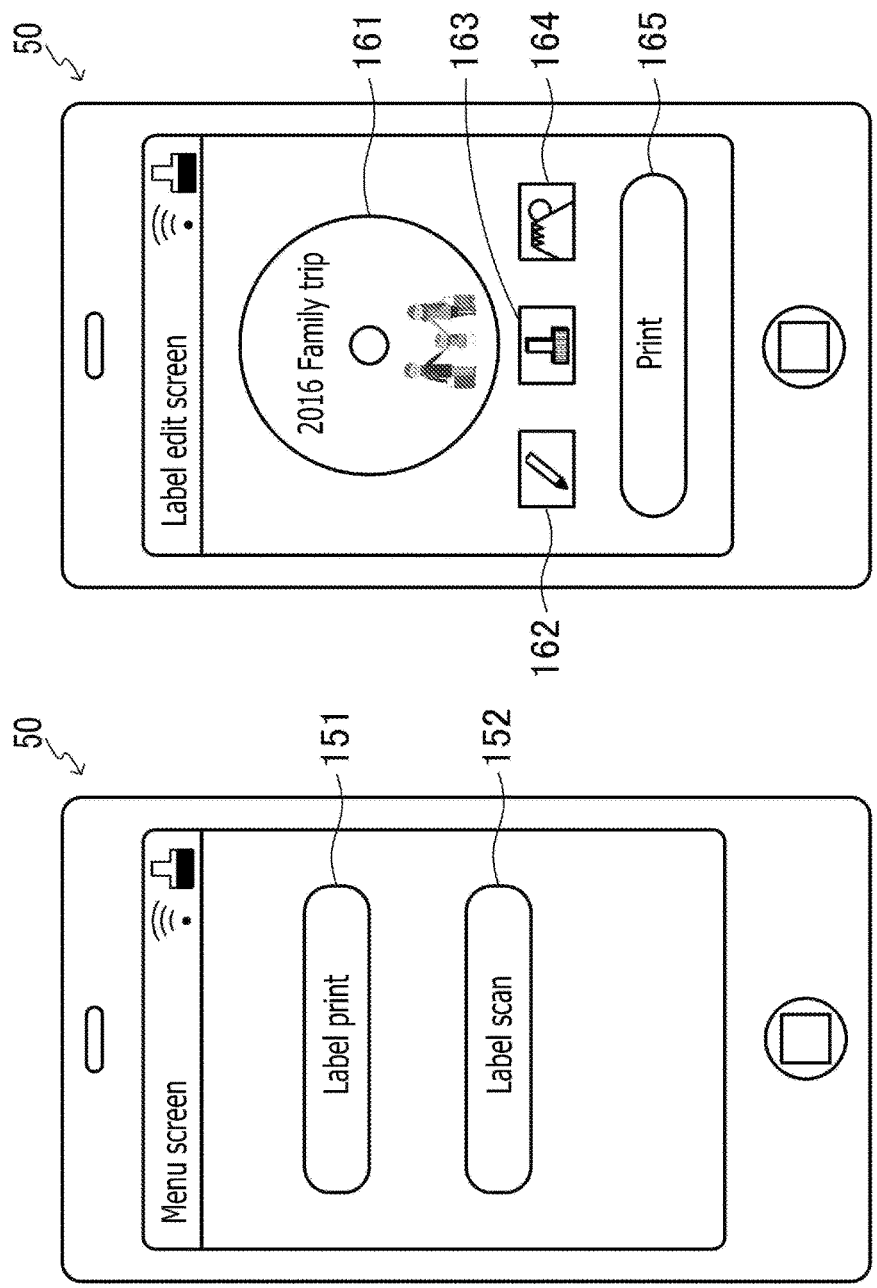
FIG. 12A is an example of a menu screen of a label program shown on the display.
FIG. 12B is an example of a label edit screen shown on the display.

Next, the label program 66 displays the menu screen as shown in FIG. 12A on the display 53 (S77, S78). The menu screen includes operation icons 151 and 152. The operation icons 151 and 152 are examples of operation objects corresponding to the "LABEL PRINT OPERATION" and "LABEL SCAN OPERATION" which are designatable operations of the label program 66. The label program 66 receives the user operation with respect to the menu screen through the input I/F 54 (S79).

When it is determined that the support function list includes all the designated device ID's (S75: ALL), the label program 66 displays all the operation icons 151 and 152 on the menu screen in a designatable state (S77). When it is determined that the support function list includes only a part of the designatable operation ID's "LABEL PRINT" (S75: PARTIAL), the label program 66 displays the operation icon 151, which corresponds to the label print operation supported by the designated device, in the designatable state, while displays the operation icon 152, which corresponds to the label print operation not supported by the designated device, in the non-designatable state on the display 53 (S78).

Next, in response to receipt of designation of the operation icon 151, which is in the designatable state, through the input I/F 54 (S79: PRINT), the label program 66 displays a label edit screen as shown in FIG. 12B (S80). The label edit screen includes, a label image 161, edit icons 162, 163 and 164, and a [PRINT] icon 165. The label program 66 receives user operations with respect to the label edit screen through the input I/F 54 (S81).

The label image is an image edited using the edit icons 162-164. The edit icon 162 corresponds to an instruction to add a character string to the label image 161. The edit icon 163 corresponds to an instruction to add a color to the label image 161. The edit icon 164 corresponds to an instruction to add a picture to the label image 161. The [PRINT] icon 165 corresponds to an execution instruction to execute the label printing. It is noted that the [PRINT] icon 165 corresponds to an execution instruction of the label printing operation.

The label program 66 edits the label image 161 in accordance with the user operations of the edit icons 162-164, and stores label image data representing the edited label image 161 in the memory 62. The above processes are for receiving designation of execution conditions of the label print operation. The execution condition of the label print operation includes, for example, image data subject to the label printing, image quality (e.g., fine, normal and the like) for the label printing operation, a color (e.g., color, monochrome, or the like) of the image to be recorded on a label.

Next, in response to receipt of designation of the [PRINT] icon 165 through the input I/F 54 (S81: YES), the label program 66 instructs the terminal program 65 to execute an operation instruction process to instruct execution of the label print operation to the designated device (S82). Specifically, the label program 66 executes an operation instructing function supplied by the terminal program 65 with designating the operation ID "LABEL PRINT" and the URI of the label image data as arguments.

In response to receipt of designation of operation icon 152, which is in the designatable state, through the input I/F 54, the label program 66 executes the operation instructing function with designating the operation ID "LABEL SCAN" as the argument (S83). Then, the label program 66 obtains the scan data the designated device generated through the terminal program 65 (S84). The label program 66 obtains the scan data as, for example, the return value of the operation instructing function.

Then, the label program 66 outputs the scan data obtained in S84 (S85). For example, the label program 66 may display the label edit screen including the scan image represented by the obtained scan data on the display 53. For another example, the label program 66 may store the obtained scan data in the memory 62.

It is noted that the label program 66 executes the label PI process when started in response to the program icon 112 shown in FIG. 10A being designated. In this case, however, the label program 66 does note obtain label information as the argument (S71: NONE). Then, the label program 66 executes the operation instructing function with designating the list notifying flag and the designatable operation ID's "LABEL PRINT" and "LABEL SCAN" as the arguments (S73). The list notifying flag is information for instructing the terminal program 65 to notify the support function list.

Next, the label program 66 obtains the support function list from the terminal program 65 as the return value of the operation instructing function executed in S73 (S74: YES). Then, the label program 66 executes steps S75 onwards using the support function list obtained in S74.

In response to determination that the designed device does not support the designatable operation (S75: 0), the label program 66 executes the operation instructing function with designating the device selection flag and the designatable operation ID's "LABEL PRINT" and "LABEL SCAN" as the arguments (S76). The device selection flag is information for instruction the terminal program 65 to execute the device selecting process.

Next, the label program 66 obtains the new support function list from the terminal program 65 as the return value of the operation instructing function executed in S76. Then, the label program 66 executes steps S75 onwards using the support function list obtained in S74. That is, the label program 66 executes steps S77 onwards with the designated device information including the designated device ID being stored in the memory 62. Description on the process in steps S77 onwards will be omitted since it has already been described.

In response to the operation designating process being executed, the OS 64 executes the terminal program 65 in the foreground, while switches the label program 66 which has been executed in the foreground to be executed in the background. Then, the terminal program 65 executes an instruction receiving process in response to the operation instructing function being executed.

Figure 9:
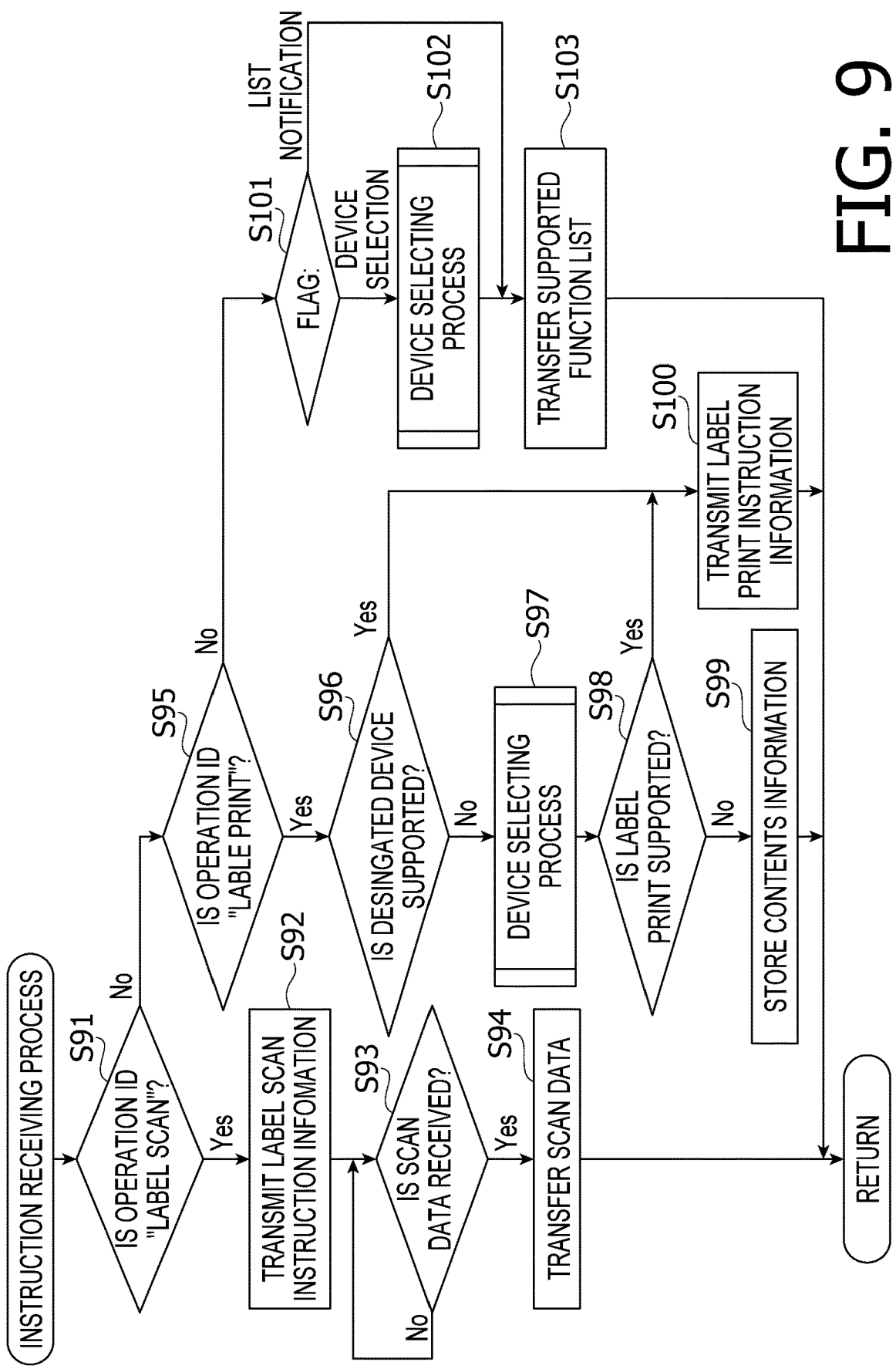
FIG. 9 is a flowchart illustrating an instruction receiving process.

Next, referring to FIG. 9, the instruction receiving process will be described in detail. The terminal program 65 obtains information designated as the argument of the operation instructing function (S91, S95, S101). The terminal program 65 transmits label scan instructing information to the designated device through the communication I/F 55 (S92) in response to, for example, receipt of the operation ID "LABEL SCAN" as the argument of the operation instructing function (S91: YES). The label scan instructing information includes, for example, the operation ID "LABEL SCAN".

Although not shown in the drawings, the device program 35 of the MFP 10 receives the label scan designating information from the mobile terminal 50 through the communication I/F 25. Then, the device program 35 causes the scanner 12 to execute the label scan operation according to the label scan instructing information as received. Then, the device program 35 transmits the scan data generated by the scanner 12 to the mobile terminal 50 through the communication I/F 25.

Next, the terminal program 65 receives the scan data from the MFP 10 through the communication I/F 55 (S93: YES) in response to the label scan instructing information. Then, the terminal program 65 delivers the scan data received in S93 to the label program 66 with designating the same as the return value of the operation instructing function. With this process, the OS 64 executes the label program 66 in the foreground, and executes the terminal program 65, which has been executed in the foreground, in the background.

In response to receipt of the operation ID "LABEL PRINT" and URI as the arguments of the operation instructing function (S95: YES), the terminal program 65 determines whether the designated device capable of executing the label print operation is designated (S96). That is, the terminal program 65 determines whether the designated device information including the operation ID "LABEL PRINT" is stored in the memory 62. It is noted that S96 is an example of a third determining process.

Next, in response to determination that the designated device capable of executing the label printing operation is not designated (S96: NO), the terminal program 65 executes the device selecting process (S97). It is noted that the searching criteria for the device selecting process executed in S97 is "the MFP's, which are communicatable through the communication network 101, capable of executing the label printing operation". Since the process of S97 is similar to the process S55 except for the searching criteria, detailed description of S97 will be omitted. It is noted that S41, which is executed in S97, is an example of a second searching process.

Next, the terminal program 65 determines, after execution of S97, whether the designated device capable of executing the label printing operation has been designated (S96). In response to determination that, in one of S96 and S98, the designated device capable of executing the label printing operation has been designated (S96: YES/S98: YES), the terminal program 65 transmits the label print instructing information to the designated device through the communication I/F 55 (S100). The label print instructing information is an example of first instructing information to execute the label print operation. It is noted that the label print instructing information includes, for example, the operation ID "LABEL SCAN" and the label image data. It is noted that S100 is an example of a first instructing process.

Although not shown in the drawings, the device program 35 of the MFP 10 receives the label print instructing information from the mobile terminal 50 through the communication I/F 25. Then, the device program 35 causes the printer 11 to execute the label printing operation in accordance with the label print instructing information as received.

In response to determination that the designated device capable of executing the label print operation is not designated (S98: NO), the terminal program 65 registers the operation ID and URI obtained in S95 with the program record of the program ID "LABEL" as the contents information (S99). It is noted that a case in which determination is made in S98 that the designated device capable of executing the label print operation is not designated is, for example, the MFP 10 capable of executing the label print operation has not been found in S41. It is note that a process in S99 is an example of a second storing process to store operation ID and the data ID obtained in S95 in the memory 62 in association with the obtain-source subordinate program.

In response to receipt of the device selection flag and the designatable operation ID as the arguments of the operation instructing function (S101: DEVICE SELECTION), the terminal program executes the device selecting process (S102). The searching criteria for the device selecting process executed in S102 is the "MFP's capable of communicating through the communication network 101 and capable of executing the designatable operation". Since the process in S102 is similar to that in S55, detailed description thereof will be omitted.

Then, the terminal program 65 delivers the support function list indicating the operation ID included in the designated device information stored in the memory 62 in S102 among the designatable operation ID's obtained in S101 to the label program 66 with designating the same as the return value of the operation instruction function (S103). With this process, the OS 64 executes the label program 66 in the foreground, while executes the terminal program 65, which has been executed in the foreground, in the background.

Further, in response to receipt of the list notifying flag and designatable operation ID as the argument of the operation instructing function (S101: LIST NOTIFICATION), the terminal program 65 delivers the support function list indicating the operation ID included in the designated device information stored in the memory 62 among the designatable operation ID's obtained in S101 to the label program 66 with designating the same as the return value of the operation instruction function (S103). With this process, the OS 64 executes the label program 66 in the foreground, while executes the terminal program 65, which has been executed in the foreground, in the background.

In FIG. 4, in response to receipt of designation of contents icon 124 which is in the designatable state through the input I/F 54 (S15: YES), the terminal program retrieves the contents information corresponding to the contents icon 124 from the memory 62. Then, the terminal program 65 transmits sheet print instructing information to the designated device through the communication I/F 55 (S19). Although not shown in the drawings, when the terminal program 65 receives designation of an icon which is in the non-designatable state through the input I/F 54, the terminal program 65 does not execute S19. It is noted that S19 is an example of a second instructing process.

The sheet print instructing information is information to execute a sheet printing operation, which is identified by the operation ID "SHEET PRINT" of the retrieved contents information, with respect to image data "ma01.jpeg" indicated by the URI of the retrieved contents information. That is, the sheet print instructing information includes, for example, the image data "map01.jpeg" indicated by the retrieved URI and the retrieved operation ID "SHEET PRINT". Although not shown in the drawings, the device program 35 of the MFP 10 receives the sheet print instructing information from the mobile terminal 60 through the communication I/F 25. Then, the device program 35 causes the printer 11 to execute the sheet printing operation in accordance with the sheet print instructing information as received.

In response to receipt of designation of the operation icon 121 through the input I/F 54 (S16: YES), the terminal program 65 transmits the sheet print instructing information to the designated device through the communication I/F 55 (S20). The sheet print instructing information transmitted in S20 includes, for example, image data which is designated by the user through the input I/F 54. Further, in response to designation of the operation icon 122 through the input I/F 54 (S16: YES), the terminal program 65 transmits sheet scan instructing information to the designated device through the communication I/F 55 (S20). The sheet scan instructing information is information for executing the sheet scan operation. The sheet scan instructing information includes, for example, the operation ID "SHEET SCAN".

Although not shown in the drawings, the device program 35 of the MFP 10 can receive the sheet scan instructing information from the mobile terminal 50 through the communication I/F 25. Then, the device program 35 causes the scanner 12 to execute the sheet scan operation in accordance with the received sheet scan instructing information. Further, the device program 35 transmits the scan data, which is generated by the scanner 12 in the sheet scan operation, to the mobile terminal 50 through the communication I/F 25. Then, the terminal program 65 stores the scan data, which is received, for example, through the communication I/F 55, in the memory 62.

<Effects of the Illustrative Embodiment>

According to the above-described illustrative embodiment, when the designated device does not support the designatable operation which can be designated by the label program 66 (S52: NO), it is possible to make the user designated a desired MFP 10 from among MFP's which can execute the designatable operation (S55) prior to starting of the label program (S57/S59). With this configuration, it is possible to make the user to select an MFP 10 suitable to the label program 66 to be started easily. It is noted that, although, in the above-describe illustrative embodiment, a case where the label program 66 is the designated program is described, the map program 67 or the name card program can also be the designated program.

According to the above-described illustrative embodiment, the operation ID of the designatable operation supported by the designated device is notified to the label program 66 as the argument of the starting API. Then, the label program 66 makes the operation icon corresponding to the designatable operation supported by the designated device be in the designatable state, while the operation icon corresponding to the designatable operation which is not supported by the designated device be in the non-designatable state. As above, the label program 66 can notify the user of function which can be used by the current designated device by obtaining the support function list.

The label program 66 may execute S77-S79 only when multiple designatable operations are supported by the designated device. Further, the label program 66 may skip S77-S79 and execute S80-S82 when the designated device supports only the label print operation. Similarly, when the designated device supports only the label scan operation, the label program 66 may skip S77-S79 and execute S83-S85.

That is, when the designated device supports only one designatable operation, the label program 66 may executes S80 onwards, assuming that the designatable operation has been designated in S79. According to such a configuration, when the designated device supports only one designatable operation, user operations with respect to the label program 66 can be reduced since S77-S79 are skipped.

It is noted that the label program is configured such that a process of encouraging the user to designate the label image data subject to the label print operation is executed even if the designated device does not support the label print operation. That is, there could be a case where it is not necessary to designate the designated device at the timing where the label program 66 is started. For example, as described above, by encouraging the user to determine whether the designated device is to be designated before the label program 66 is started through the confirmation screen, a process of designating the designated device can be executed at an appropriate timing.

According to the above-described illustrative embodiment, when the label program 66 is started without designating the designated device (S58: OUTPUT; S59), and the label print operation is instructed through the label program 66 (S95: YES; S96: NO), the device selecting process is executed (S97). Accordingly, it is possible to encourage the user to select a desired MFP 10 from among the MFP's 10 capable of executing the label print operation at a timing when the label print operation is instructed.

Further, according to the above-described illustrative embodiment, when there is no MFP 10 that can execute the label print operation instructed by the label program 66 (S98: NO), the operation ID and the URI obtained from the label program 66 are stored in the memory 62 (S99). Then, in response to designation of the contents icon on the main screen (S15: YES), the terminal program 65 causes the designated device to execute the output operation in accordance with the contents information stored in the memory 62 (S19). According to this configuration, it is possible to suppress a case where the operations the user has performed with respect to the label program 66, for example, to edit the label image 161 are wasted.

It is noted that the contents icon 124 is displayed in the designatable mode when the designated device information includes the operation ID of the contents information, while displayed in the non-designatable mode when the designated device information does not include the operation ID of the contents information. further, as the contents icon 124, a thumbnail image or the like created by processing the image data indicated by the URI is used. According to this configuration, it is possible to notify the user that the contents information is stored in the memory 62, and to encourage the user to execute the outputting operation in accordance with the contents information.

Further, according to the above-described illustrative embodiment, the device icon 131 corresponding to the MFP 10B which can execute all the designatable operations is displayed with a higher priority than the device icon 132 corresponding to the MFP 10A which executes only a part of the designatable operations (see FIG. 11A). Further, the designatable operations which can be executed by the MFP's 10A and 10B, which have been found in S41, are notified through the device icons 131 and 132. With this configuration, it is possible to encourage the user to designate an appropriate MFP 10 suitable to the label program 66.

According to the above-described illustrative embodiment, the label program 66 determines whether the designated device supports the designatable operation at a timing when the label program is started (S75). When it is determined that the designated device does not support the designatable operation, the label program 66 causes the terminal program 65 to execute a process of encouraging the user to designate the designated device from among the MFP's 10 capable of executing the designatable operation (S76; S102). With this configuration, the user can easily select an appropriate designated device before the label program 66 executes S82/S83.

In the above-described illustrative embodiment, the CPU's 31 and 61 of the MFP 10 and the mobile terminal 50 executes the programs stored in the memories 32 and 62, respectively, thereby the processes described above being realized by the controllers. It is noted that the configuration of the controllers need not be limited to those described above, but can be modified in various ways without departing from the aspects of the disclosures. For example, a part of or the whole of the controller may be realized by hardware such as an integrated circuit.

It is noted that the aspects of the disclosures above can be realized not only as the MFP 10 and/or the mobile terminal 10, but as programs causing the MFP 10 and/or the mobile terminal 10 to execute the processes. Such programs may be stored in a non-transitory recording medium and distributed. The non-transitory recording medium may include a CD-ROM, a DVD-ROM and the like. Further, the non-transitory recording medium may include a storage device of a server which is connectable to the MFP 10 and the mobile terminal 50 through the communication network 101. Furthermore, the programs stored in the storage of the server may be transmitted, as information or a signal indicative of the programs, or transmitted through the communication network 101 such as the Internet.

What is claimed is:

1. A non-transitory computer-readable recording medium storing a first instruction-set of computer-readable instructions for a mobile terminal having a memory, an input interface, a communication interface, and a controller;

the first instruction-set of the computer-readable instructions being installed into the memory, the first instruction-set, when executed by the controller, causing the mobile terminal to perform:

a device designating process of designating a designated device, the device designating process including receiving, through the input interface, a selecting operation of selecting one of a plurality of devices communicable to the mobile terminal via the communication interface and storing device identification information indicating a device selected by the selecting operation in the memory, the designated device being a device applicable to at least one of a plurality of execution operations corresponding to the first instruction-set, the designated device being configured to execute an applicable operation in response to receipt of an execution instruction of the applicable operation;

a first designating process of designating a designated application program in a state where the device identification information indicating the designated device is stored in the memory, the designated application program being one of a plurality of application programs, each of the plurality of application programs being installed into the memory, the designated application program being an application program applicable to at least one of the plurality of execution operations corresponding to the first instruction-set; and a first determining process of determining whether a designated device indicated by the device identification information stored in the memory is applicable to an execution operation applicable to the designated application program among the plurality of execution operations;

a starting process of:

when the first determining process determines that the designated device is not applicable to the execution operation applicable to the designated application program:

searching, in a first searching process, for one or more image processing devices capable of communicating with the mobile terminal and applicable to the execution operation applicable to the designated application program;

displaying a list of the image processing devices found by the searching, the list of the image processing devices being applicable to the execution operation; and executing a selected device selecting process of receiving a selection of a device from the displayed list, which is different from the designated device, from among the plurality of image processing devices capable of communicating with the mobile terminal through the communication interface and applicable to the execution operation applicable to the designated application program, and starting the designated application program to instruct the device selected by the selected device selecting process to execute the execution operation applicable to the designated application program; and when the first determining process determines that the designated device is applicable to the execution operation applicable to the designated application program, starting the designated application program to instruct the designated device to execute the execution operation applicable to the designated application program without executing the selected device selecting process, wherein each of the plurality of execution operations is one of an outputting operation of outputting image data obtained from a corresponding one of the plurality of application programs and an inputting operation of generating the image data to be inputted to a corresponding one of the plurality of application programs, and wherein the first instruction set of the computer-readable instructions cause, when executed by the controller, the mobile terminal to further perform:

in response to no image processing device, which is capable of communicating with the mobile terminal and applicable to the execution operation applicable to the designated application program, being found in the first searching process, a storing process of storing information indicating the execution operation applicable to the designated application program and information indicating the image data in association with the designated application program.

2. The non-transitory computer-readable recording medium according to claim 1, wherein the designated application program being capable of instructing the image processing device to execute a plurality of designated operations, and wherein the first instruction-set of the computer-readable instructions causes, when executed by the controller, the mobile terminal to further perform:

a first storing process of storing designated device information of the designated device;

an extracting process of extracting a designated operation ID, from among a plurality of designated operation ID's respectively corresponding to the plurality of designated operations, included in the designated device information; and starting, in the starting process, the designated application program with designating the designated operation ID as extracted as an argument.

3. The non-transitory computer-readable recording medium according to claim 1, wherein the first instruction-set of the computer-readable instructions further cause, when executed by the controller, the mobile terminal to perform:

in response to determining that the designated device is applicable to the designated application program, a receiving process of receiving one of a first instructing operation corresponding to an instruction to designate the designated device and a second instructing operation corresponding to an instruction not to designate the designated device; and in response to receipt of the first instructing operation in the receiving process, executing the first searching process of searching for an image processing device capable of executing the designated operation.

4. The non-transitory computer-readable recording medium according to claim 3, wherein the first instruction-set of the computer-readable instructions further causes, when executed by the controller, cause the mobile terminal to further perform:

in response to receiving the second instructing operation in the receiving process, a second determining process of determining whether the designated operation includes the outputting operation;

in response to determining that the designated operation includes the outputting operation in the second determining process, starting the designated application program, in the starting process, with designating a designated operation ID identifying the outputting operation as an argument; and in response to determining that the designated operation does not include the outputting operation in the second determining process, starting the designated application program, in the starting process, with designating information indicating that the designated device is not designated as the argument.

5. The non-transitory computer-readable recording medium according to claim 4, wherein the first instruction-set of the computer-readable instructions cause, when executed by the controller, the mobile terminal to further perform:

a first obtaining process of obtaining the designated operation ID;

in response to obtaining of the designated operation ID identifying the outputting operation and a data ID identifying the image data subject to the outputting operation in the first obtaining process, a third determining process of determining whether the designated device is capable of executing the outputting operation identified by the designated operation ID; and in response to determining that the designated device is capable of executing the outputting operation identified by the designated operation ID, executing a first instructing process of transmitting first instruction information to the designated device through the communication interface, the first instruction information being information causing the designated device to execute the designated operation.

6. The non-transitory computer-readable recording medium according to claim 5, wherein the first instruction-set of the computer-readable instructions cause, when executed by the controller, the mobile terminal to further perform:
in response to determining that the designated device is not capable of executing the outputting operation identified by the designated operation ID, a second searching process of searching the plurality of image processing devices which can be communicated with the mobile terminal through the communication interface for the image processing device capable of executing the outputting operation identified by the designated operation ID; and
in response to finding the image processing device in the second searching process, executing:
a device designating process of designating one of the plurality of image processing devices searched in the searching process as the designated device; and
the first instructing process.

7. The non-transitory computer-readable recording medium according to claim 6, wherein the mobile terminal has a display,
wherein the first instruction-set of the computer-readable instructions cause, when executed by the controller, the mobile terminal to further perform:
a first displaying process of displaying, on the display, a first screen including a first object corresponding to the application program to which the designated operation ID or the data ID is not associated, and second object corresponding to a subordinate program to which the designated operation ID or the data ID is associated, prior to the first designating process;
in response to designation of the first object in the first designating process, the first determining process with the application program corresponding to the first object as being the designated application program; and
in response to designation of the second object in the first designating process, a second designating process of making the designated device to transmit second designated information to the mobile terminal through the communication interface,
the second designated information being information to execute the outputting operation identified by the designated operation ID with the image data identified by the data ID being subject to the outputting operation.

8. The non-transitory computer-readable recording medium according to claim 7, wherein the first instruction-set of the computer-readable instructions cause, when executed by the controller, the mobile terminal to further perform:
when the designated device information includes the designated operation ID associated with the application program, displaying, in the first displaying process, the second object corresponding to the application program in a designated state; and
when the designated device information does not include the designated operation ID associated with the application program, displaying, in the first displaying process, the second object corresponding to the application program in a non-designated state.

9. The non-transitory computer-readable recording medium according to claim 7, wherein the first object is an image indicating the corresponding application program, and
wherein the second object is one of an image indicating the number of the data ID's associated with the application program and an image indicating a modification of the image data identified by the data ID.

10. The non-transitory computer-readable recording medium according to claim 1, wherein the mobile terminal has a display, wherein the designated application program is capable of instructing the image processing device to execute a plurality of designated operations, and
wherein the first instruction-set of the computer-readable instructions cause, when executed by the controller, the mobile terminal to further perform:
searching, in the first searching process, for the image processing device capable of executing at least one of the plurality of designated operations from among the plurality of image processing devices capable of communication with the mobile terminal through the communication interface;
a second displaying process of displaying a second screen including a plurality of device objects respectively corresponding to the plurality of image processing devices found in the first searching process on the display, a device object corresponding to the image processing device capable of executing all the designated operations being displayed with a higher priority than the device object corresponding to the image processing device capable of executing a part of the designated operations; and
an object designating process of designating one of the plurality of device objects.

11. The non-transitory computer-readable recording medium according to claim 10, wherein the first instruction-set of the computer-readable instructions cause, when executed by the controller, the mobile terminal to further perform:
notifying, in the second displaying process, the designated operations which the image processing device is capable of executing through the device object.

12. The non-transitory computer-readable recording medium according to claim 1,
wherein the designated operation is an operation of which execution is to be instructed by the designated application program, and
wherein the first determining process determines that the designated device is applicable to the designated application program when the designated device is capable of executing the designated operation.

13. The non-transitory computer-readable recording medium according to claim 1, wherein the execution operation is an outputting operation of outputting image data,
wherein the first instruction-set of the computer-readable instructions cause, when executed by the controller, the mobile terminal to further perform:
a object designating process of designating the image data subject to the outputting operation; and
a first instructing process of causing the designated device through the designated application program to execute the outputting operation to output the image data designated in the object designating process.

14. The non-transitory computer-readable recording medium according to claim 1, wherein the execution operation is an inputting operation of generating image data to be inputted to the mobile terminal,
   wherein the first instruction-set of the computer-readable instructions cause, when executed by the controller, the mobile terminal to further perform:
      a data designating process of designating the image data generated by the inputting operation; and
      a first instructing process of causing the designated device through the designated application program to execute the inputting operation to input the image data designated in the data designating process.

* * * * *

UNITED STATES PATENT AND TRADEMARK OFFICE
CERTIFICATE OF CORRECTION

PATENT NO. : 11,489,976 B2
APPLICATION NO. : 16/444606
DATED : November 1, 2022
INVENTOR(S) : Norihiko Asai It is certified that error appears in the above-identified patent and that said Letters Patent is hereby corrected as shown below:

In the Claims

Claim 1, Column 21, Line 48: Delete "instruction set" and insert -- instruction-set -- therefor.

Claim 7, Column 23, Line 35: Delete "second object" and insert -- a second object -- therefor.

Signed and Sealed this
Eighth Day of August, 2023

Katherine Kelly Vidal
*Director of the United States Patent and Trademark Office*